United States Patent
Nakazawa et al.

(10) Patent No.: US 12,502,065 B2
(45) Date of Patent: Dec. 23, 2025

(54) OPHTHALMIC INFORMATION PROCESSING APPARATUS, OPHTHALMIC APPARATUS, OPHTHALMIC INFORMATION PROCESSING METHOD, AND RECORDING MEDIUM ESTIMATING CLASSIFICATION RESULT OF PATHOLOGICAL CONDITION OF DISEASE OF SUBJECT'S EYE

(71) Applicants: Topcon Corporation, Tokyo (JP); TOHOKU UNIVERSITY, Sendai (JP)

(72) Inventors: Toru Nakazawa, Sendai (JP); Kazuko Omodaka, Sendai (JP); Guangzhou An, Tokyo (JP)

(73) Assignees: TOPCON CORPORATION, Tokyo (JP); TOHOKU UNIVERSITY, Sendai (JP)

( * ) Notice: Subject to any disclaimer, the term of this patent is extended or adjusted under 35 U.S.C. 154(b) by 271 days.

(21) Appl. No.: 18/214,537

(22) Filed: Jun. 27, 2023

(65) Prior Publication Data
US 2023/0337908 A1   Oct. 26, 2023

Related U.S. Application Data

(63) Continuation of application No. PCT/JP2021/040332, filed on Nov. 2, 2021.

(30) Foreign Application Priority Data

Dec. 28, 2020   (JP) ................ 2020-219319

(51) Int. Cl.
*A61B 3/10* (2006.01)
*A61B 3/00* (2006.01)
(Continued)

(52) U.S. Cl.
CPC .............. *A61B 3/102* (2013.01); *A61B 3/005* (2013.01); *A61B 3/1225* (2013.01); *G06T 7/0012* (2013.01); *G06T 2207/30041* (2013.01)

(58) Field of Classification Search
None
See application file for complete search history.

(56) References Cited

U.S. PATENT DOCUMENTS

| 2008/0204655 A1 | 8/2008 | Kikawa et al. |
| 2011/0190657 A1 | 8/2011 | Zhou et al. |
| (Continued) | | |

FOREIGN PATENT DOCUMENTS

| JP | 2008-206684 A | 9/2008 |
| JP | 2013-501553 A | 1/2013 |
| (Continued) | | |

OTHER PUBLICATIONS

International Search Report and Written Opinion mailed on Dec. 14, 2021, received for PCT Application PCT/JP2021/040332, filed on Nov. 2, 2021, 11 pages including English Translation.
(Continued)

*Primary Examiner* — Lennin R Rodriguezgonzalez
(74) *Attorney, Agent, or Firm* — XSENSUS LLP

(57) ABSTRACT

An ophthalmic information processing apparatus includes a feature amount extractor and a classifier. The feature amount extractor is configured to extract a feature amount of each of two or more images different from each other of a subject's eye. The classifier is configured to output two or more confidence score information for estimating classification result of a pathological condition of a disease of the subject's eye, based on the feature amounts of each of the two or more images extracted by the feature amount extractor and one or more background data representing a state of the subject or a state of the subject's eye.

19 Claims, 21 Drawing Sheets

(51) Int. Cl.
  *A61B 3/12*  (2006.01)
  *G06T 7/00*  (2017.01)

(56) References Cited

U.S. PATENT DOCUMENTS

| | | |
|---|---|---|
| 2018/0368679 A1 | 12/2018 | An et al. |
| 2019/0180441 A1 | 6/2019 | Peng et al. |
| 2019/0220973 A1 | 7/2019 | Cho et al. |
| 2020/0065967 A1 | 2/2020 | Sugaya et al. |
| 2020/0074622 A1 | 3/2020 | Yang et al. |
| 2020/0356805 A1 | 11/2020 | Sun et al. |
| 2021/0209762 A1 | 7/2021 | Peng et al. |
| 2022/0005584 A1 | 1/2022 | Takahashi et al. |

FOREIGN PATENT DOCUMENTS

| | | |
|---|---|---|
| JP | 2019-005319 A | 1/2019 |
| JP | 2019-528113 A | 10/2019 |
| JP | 2020-032190 A | 3/2020 |
| JP | 2020-036835 A | 3/2020 |
| WO | 2018/211688 A1 | 11/2018 |
| WO | 2019/007800 A1 | 1/2019 |
| WO | 2019/207800 A1 | 10/2019 |
| WO | 2020/202680 A1 | 10/2020 |
| WO | 2020/213748 A1 | 10/2020 |

OTHER PUBLICATIONS

Office Action issued on Oct. 29, 2024, in corresponding Japanese patent Application No. 2020-219319, 6 pages.
Extended European search report issued on Oct. 29, 2024, in corresponding European patent Application No. 21915990.3, 10 pages.
Riken website, Tohoku University, "High-precision glaucoma automatic diagnosis using artificial intelligence—Contributing to the objective diagnosis of glaucoma through machine learning using multi-modality information-", Mar. 28, 2019, total 19 pages; with English Machine Translation by Google, https://www.riken.jp/press/2019/20190328_2/.
Riken website, Tohoku University, "Automatic classification of optic disc shape in glaucoma—Contributing to the diagnosis of glaucoma with machine learning models", Dec. 27, 2017, total 19 pages; with English Machine Translation by Google, https://www.riken.jp/press/2017/20171227_2/index.html.
Parmita Mehta et al., "Automated Detection of Glaucoma With Interpretable Machine Learning Using Clinical Data and Multimodal Retinal Images", Feb. 27, 2020, total 20 pages.
Guangzhou An et al., "Comparison of Machine-Learning Classification Models for Glaucoma Management", Hindawi, Journal of Healthcare Engineering, vol. 2018, Article ID 6874765, 8 pages, Jun. 19, 2025, total 9 pages.
Guangzhou An et al., "Glaucoma Diagnosis with Machine Learning Based on Optical Coherence Tomography and Color Fundus Images", Hindawi, Journal of Healthcare Engineering, vol. 2019, Article ID 4061313, 9 pages, Feb. 18, 2019, total 10 pages.
Masaki Tanito et al.,"Differentiation of glaucomatous optic discs with different appearances using optic disc topography parameters: The Glaucoma Stereo Analysis Study", Plos One, Feb. 8, 2017, total 14 pages.

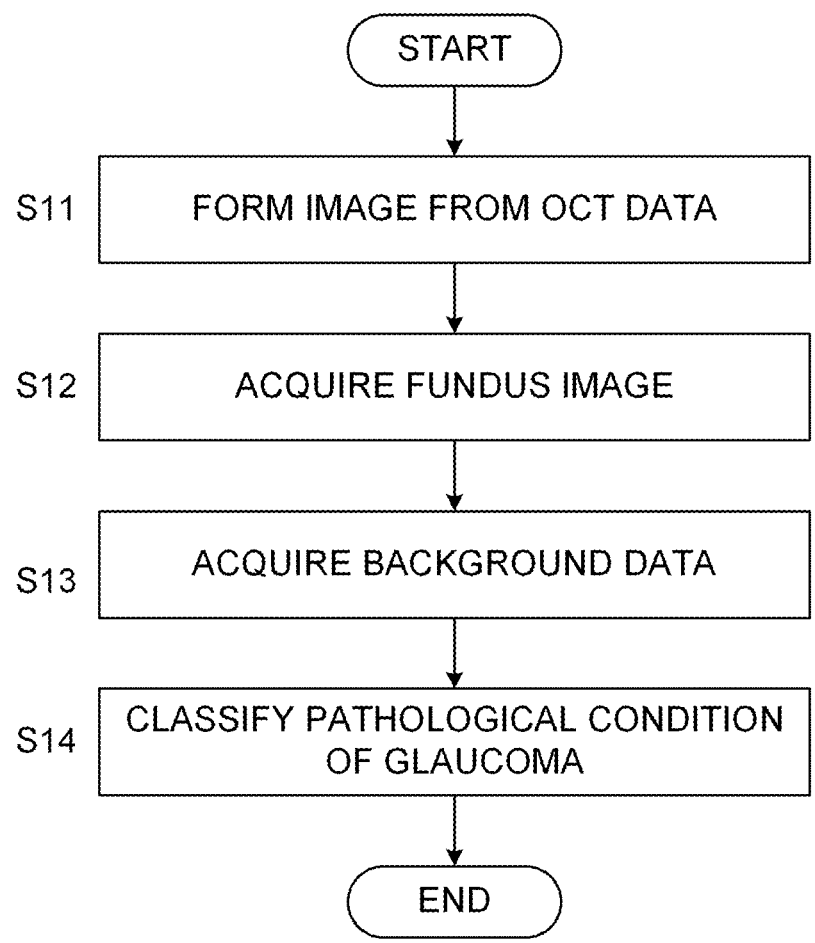

FIG. 12

|  | INPUT IMAGE | | | | |
|---|---|---|---|---|---|
| HORIZONTAL LATERAL B-SCAN IMAGE PASSING THROUGH CENTER OF OPTIC DISC (IMG-1) | INCLUDED | INCLUDED | INCLUDED | INCLUDED | INCLUDED |
| VERTICAL B-SCAN IMAGE PASSING THROUGH CENTER OF OPTIC DISC (IMG-2) | INCLUDED | INCLUDED | INCLUDED | INCLUDED | INCLUDED |
| PROJECTION IMAGE (IMG-4) | INCLUDED | INCLUDED | INCLUDED | INCLUDED | INCLUDED |
| EN-FACE IMAGE (IMG-5) | INCLUDED | INCLUDED | INCLUDED | INCLUDED | INCLUDED |
| VERTICAL B-SCAN IMAGE PASSING THROUGH FOVEA (IMG-3) | NOT INCLUDED | INCLUDED | NOT INCLUDED | NOT INCLUDED | INCLUDED |
| B-SCAN IMAGE PASSING THROUGH MIDWAY BETWEEN CENTER OF OPTIC DISC AND FOVEA (IMG-6) | NOT INCLUDED | NOT INCLUDED | INCLUDED | NOT INCLUDED | INCLUDED |
| COLOR FUNDUS IMAGE (IMG-7) | NOT INCLUDED | NOT INCLUDED | NOT INCLUDED | INCLUDED | INCLUDED |
| $\kappa$-VALUE | 0.654 | 0.661 | 0.663 | 0.728 | 0.733 |

FIG. 13

| | | TEACHING DATA | | | | |
|---|---|---|---|---|---|---|
| | | FI | GE | MY | SS | PRECISION |
| CLASSIFICATION RESULT | FI | 14 | 3 | 3 | 0 | 70.0% |
| | GE | 4 | 86 | 7 | 5 | 84.3% |
| | MY | 0 | 2 | 67 | 2 | 94.3% |
| | SS | 1 | 7 | 3 | 11 | 50.0% |
| RECALL | | 73.7% | 87.8% | 83.8% | 61.1% | ACCURACY 82.4% |

($\kappa$-VALUE: 0.733)

FIG. 14

| | | TEACHING DATA | | | | PRECISION |
|---|---|---|---|---|---|---|
| | | FI | GE | MY | SS | |
| CLASSIFICATION RESULT | FI | 15 | 2 | 3 | 0 | 75.0% |
| | GE | 2 | 22 | 0 | 3 | 81.5% |
| | MY | 0 | 1 | 25 | 2 | 89.3% |
| | SS | 0 | 5 | 3 | 14 | 50.0% |
| RECALL | | 88.2% | 73.3% | 80.6% | 73.6% | ACCURACY 78.2% |

($\kappa$-VALUE: 0.708)

↓ ADD BACKGROUND DATA

| | | TEACHING DATA | | | | PRECISION |
|---|---|---|---|---|---|---|
| | | FI | GE | MY | SS | |
| CLASSIFICATION RESULT | FI | 16 | 1 | 3 | 0 | 80.0% |
| | GE | 2 | 22 | 0 | 3 | 81.5% |
| | MY | 1 | 1 | 25 | 1 | 89.3% |
| | SS | 0 | 4 | 3 | 15 | 68.2% |
| RECALL | | 84.2% | 78.6% | 80.6% | 78.9% | ACCURACY 80.2% |

($\kappa$-VALUE: 0.736)

FIG. 15

|  |  | TEACHING DATA | | | | PRECISION |
|---|---|---|---|---|---|---|
|  |  | FI | GE | MY | SS |  |
| CLASSIFICATION RESULT | FI | 16 | 1 | 3 | 0 | 80.0% |
|  | GE | 2 | 22 | 0 | 3 | 81.5% |
|  | MY | 1 | 1 | 25 | 1 | 89.3% |
|  | SS | 0 | 4 | 3 | 15 | 68.2% |
| RECALL | | 84.2% | 78.6% | 80.6% | 78.9% | ACCURACY 80.2% |

($\kappa$-VALUE: 0.736)

↓ ADD FEATURE SELECTION

|  |  | TEACHING DATA | | | | PRECISION |
|---|---|---|---|---|---|---|
|  |  | FI | GE | MY | SS |  |
| CLASSIFICATION RESULT | FI | 16 | 2 | 2 | 0 | 80.0% |
|  | GE | 2 | 22 | 1 | 2 | 81.5% |
|  | MY | 1 | 1 | 24 | 2 | 85.7% |
|  | SS | 1 | 3 | 1 | 17 | 77.2% |
| RECALL | | 80.0% | 78.6% | 85.7% | 81.0% | ACCURACY 81.4% |

($\kappa$-VALUE: 0.751)

OPHTHALMIC INFORMATION PROCESSING APPARATUS, OPHTHALMIC APPARATUS, OPHTHALMIC INFORMATION PROCESSING METHOD, AND RECORDING MEDIUM ESTIMATING CLASSIFICATION RESULT OF PATHOLOGICAL CONDITION OF DISEASE OF SUBJECT'S EYE

CROSS-REFERENCE TO RELATED APPLICATIONS

The present application is a continuation application of International Patent Application No. PCT/JP2021/040332, filed Nov. 2, 2021, which claims priority to Japanese Patent Application No. 2020-219319, filed Dec. 28, 2020, both of which are herein incorporated by reference in their entirety.

FIELD

The disclosure relates to an ophthalmic information processing apparatus, an ophthalmic apparatus, an ophthalmic information processing method, and a recording medium.

BACKGROUND

In recent years, machine learning methods represented by deep learning have been advancing rapidly and the practical applications of artificial intelligence technologies have been progressing in various fields. Particularly in the medical field, deep learning has improved the accuracy of detecting appearances, etc. of disease sites or tissues in diagnostic images, and accurate and highly precise medical diagnoses can be promptly performed.

For example, International Publication WO2018/211688 discloses a method for performing machine learning using characteristic points in a time-series plurality of fundus images in the past as teaching data, and diagnosing glaucoma from a time-series plurality of fundus images newly acquired using the obtained learned model. For example, Japanese Unexamined Patent Publication No. 2019-5319 discloses a method for classifying the pathological conditions of glaucoma in accordance with the shape of the optic disc using a neural network.

SUMMARY

One aspect of embodiments is an ophthalmic information processing apparatus including: a feature amount extractor configured to extract a feature amount of each of two or more images different from each other of a subject's eye; and a classifier configured to output two or more confidence score information for estimating classification result of a pathological condition of a disease of the subject's eye, based on the feature amounts of each of the two or more images extracted by the feature amount extractor and one or more background data representing a state of the subject or a state of the subject's eye.

Another aspect of the embodiments is an ophthalmic apparatus including: an optical system configured to acquire the two or more image; and the ophthalmic information processing apparatus described above.

Still another aspect of the embodiments is an ophthalmic information processing method including: a feature amount extracting step of extracting a feature amount of each of two or more images different from each other of a subject's eye; and a classifying step of outputting two or more confidence score information for estimating classification result of a pathological condition of a disease of the subject's eye, based on the feature amounts of each of the two or more images extracted in the feature amount extracting step and one or more background data representing a state of the subject or a state of the subject's eye.

Still another aspect of the embodiments is a computer readable non-transitory recording medium in which a program of causing a computer to execute each step of the ophthalmic information processing method described above is recorded.

BRIEF EXPLANATION OF THE DRAWINGS

FIG. 11 is a schematic diagram illustrating an example of an operation flow of the ophthalmic apparatus according to the embodiments.

FIG. 12 is a schematic diagram for explaining an operation of the ophthalmic apparatus according to the embodiments.

FIG. 13 is a schematic diagram for explaining an operation of the ophthalmic apparatus according to the embodiments.

FIG. 14 is a schematic diagram for explaining an operation of the ophthalmic apparatus according to the embodiments.

FIG. 15 is a schematic diagram for explaining an operation of the ophthalmic apparatus according to the embodiments.

DETAILED DESCRIPTION

Figure 1A:
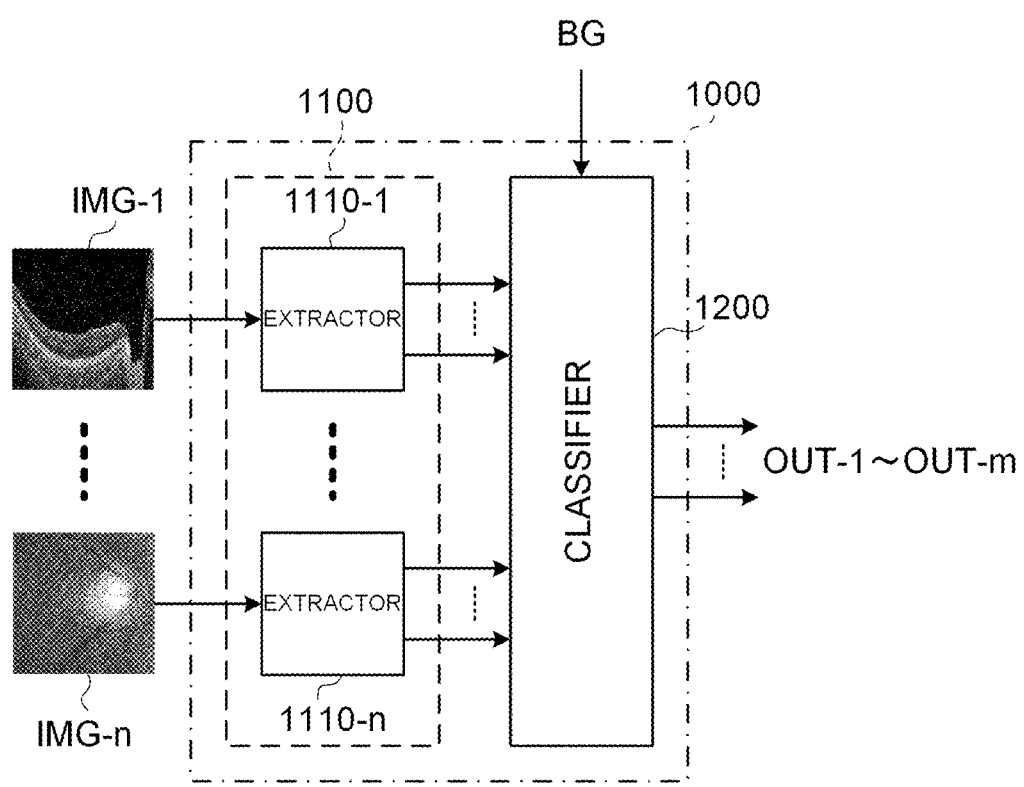
FIG. 1A is a schematic diagram illustrating an example of a configuration of an ophthalmic information processing apparatus according to embodiments.

For example, fundus diseases such as glaucoma, age-related macular degeneration, or diabetic retinopathy are diseases that can progress if appropriate treatment is not given, even when detected at an early stage through screening or other means. In this case, appropriate understanding of the pathological condition of the disease allows appropriate medical treatment to be given for the disease.

Thus, there is a need for highly accurate and early detection of the fundus diseases, as well as highly accurate identification of the pathological condition of the detected fundus diseases. This applies not only to the fundus diseases but also to any diseases of a subject's eye.

According to some embodiments of the present invention, a new technique for giving appropriate treatment for diseases of a subject's eye at an early stage can be provided.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to the drawings, exemplary some embodiments of an ophthalmic information processing apparatus, an ophthalmic apparatus, an ophthalmic information processing method, and a recording medium according to some embodiments of the present invention are described below. Any of the contents of the documents cited in the present specification and arbitrary known techniques may be applied to the embodiments below.

An ophthalmic information processing apparatus according to embodiments is configured to extract feature amounts of each of two or more images different from each other of an eye of a subject (subject's eye) and to output two or more confidence score information for estimating classification result(s) of a pathological condition of a disease of a subject's eye, based on the extracted two or more feature amounts and one or more background data. For example, the ophthalmic information processing apparatus extracts the feature amounts for each of the images using a learned model obtained by performing supervised machine learning for each of the images. For example, the ophthalmic information processing apparatus outputs two or more confidence score information from the two or more feature amounts extracted for each image and the one or more background data, using a classification model obtained by performing supervised machine learning. In some embodiments, the ophthalmic information processing apparatus outputs a classification result(s) of the pathological condition of the disease of the subject's eye based on the two or more confidence score information described above, as estimation information.

Here, the two or more images are images of a predetermined site (for example, fundus) of the subject's eye with different imaging (photographing) directions from each other. For example, the two or more images include one or more OCT images in a desired cross-sectional orientation generated from three-dimensional OCT data acquired using Optical Coherence Tomography (OCT) on the subject's eye, and a front image (for example, fundus image) acquired using an imaging optical system. The OCT image may be a tomographic image or a front image.

Further, the feature amount may be a feature amount in an intermediate layer of the learned model or confidence score information for estimating the classification result(s) of the pathological condition of the disease of the subject's eye in the output layer of the learned model.

Further, the background data is data representing a state of the subject or a state of the subject's eye. Examples of the data representing the state of the subject include, for example, age, gender, nationality, place of birth, data indicating a relationship to genetic factors of the disease, and data indicating a relationship to environmental factors of the disease. Examples of the data representing the state of the subject's eye include, for example, data indicating the morphology of the subject's eye and data indicating a visual function of the subject's eye. The data representing the state of the subject's eye is acquired by examining the subject's eye either objectively or subjectively.

Furthermore, the confidence score information is information representing a confidence score of an estimated result of a pathological condition of a disease of a subject's eye (e.g., the probability of being estimated to be the relevant pathological condition), for each of a plurality of pathological conditions of a predetermined disease.

In the following, a case where the ophthalmic information processing apparatus, the ophthalmic apparatus, the ophthalmic information processing method, and the program according to the embodiments are applied to a fundus disease will be described. However, the field of application of the ophthalmic information processing apparatus, the ophthalmic apparatus, the ophthalmic information processing method, and the program according to the embodiments is not limited to the fundus disease, but can be applied to any diseases of the subject's eye.

For example, the ophthalmic information processing apparatus is configured to output two or more confidence score information for estimating classification result(s) of a pathological condition of a fundus disease of a subject's eye from a plurality of images of a fundus of the subject's eye and one or more background data of the subject or the subject's eye.

Examples of the fundus disease include glaucoma, age-related macular degeneration, and diabetic retinopathy.

In case that the fundus disease is glaucoma, for example, the confidence score information (classification information)

for estimating the classification result(s) based on the shape of the optic disc is output in order to classify the pathological condition according to the classification by Nicolela et al. (Nicolela's classification) as disclosed in Japanese Unexamined Patent Publication No. 2019-5319.

In case that the fundus disease is age-related macular degeneration, for example, the confidence score information for estimating the classification result(s) based on the morphology of the retinal pigment epithelium layer (e.g., morphology of the choroidal neovascularization) is output in order to classify whether the disease is atrophic type or exudative type.

In case that the fundus disease is diabetic retinopathy, for example, the confidence score information for estimating the classification result(s) based on the morphology or distribution of capillary microaneurysm, hemorrhage, leukoma, neovascular, or hemorrhage region is output in order to classify whether the fundus disease is simple diabetic retinopathy, preproliferative diabetic retinopathy, or proliferative diabetic retinopathy.

In this way, by making it possible to provide doctors (physicians) and others with the confidence score information on the pathological condition classification of the fundus diseases, an effective treatment for the fundus diseases can be determined at an early stage. This allows to increase the possibility of curing the fundus diseases.

For example, in cases where the fundus disease is determined to be glaucoma, the appropriate treatment can be selected among drug therapy, laser therapy, surgery, etc., depending on the pathological condition of the disease.

For example, in cases where the fundus disease is determined to be age-related macular degeneration, the appropriate treatment can be selected among drugs, laser therapy, surgery, etc., depending on the pathological condition of the disease.

For example, in cases where the fundus disease is determined to be diabetic retinopathy, the appropriate treatment can be selected among retinal photocoagulation, vitreous surgery, etc., depending on the pathological condition of the disease.

In the following embodiments, a case where the fundus disease is glaucoma and the ophthalmic information processing apparatus is configured to output the two or more confidence score information for estimating the classification result(s) of the pathological condition according to Nicolela's classification from two or more images of the subject's eye and one or more background data of the subject or the subject's eye will be described. Here, the two or more images of the subject's eye include one or more OCT images generated from three-dimensional OCT data of the subject's eye and a color fundus image. The one or more background data include the age of the subject and one or more measured values obtained by measuring the subject's eye subjectively or objectively.

The ophthalmic information processing apparatus can perform predetermined analysis processing and/or predetermined display processing on the three-dimensional OCT data of the subject's eye acquired using optical coherence tomography (OCT) by an ophthalmic apparatus. The ophthalmic apparatus according to some embodiments has not only a function of an OCT apparatus for performing OCT, but also functions of at least one of a fundus camera, a scanning laser ophthalmoscope, a slit lamp microscope, and a surgical microscope. Further, the ophthalmic apparatus has a function of measuring optical characteristics of the subject's eye. Examples of the ophthalmic apparatus having the function of measuring optical characteristics of the subject's eye include a refractometer, a keratometer, a tonometer, a wave front analyzer, a specular microscope, a perimeter, and the like. The ophthalmic apparatus according to some embodiments has a function of a laser treatment apparatus used for laser treatment.

In some embodiments, the ophthalmic apparatus includes the ophthalmic information processing apparatus (ophthalmic image processing apparatus, ophthalmic analysis apparatus) according to the embodiments. An ophthalmic information processing method according to the embodiments is performed by the ophthalmic information processing apparatus. A program according to the embodiments causes a processor (computer) to execute each step of the ophthalmic information processing method. A recording medium according to the embodiments is a computer readable non-transitory recording medium (storage medium) on which the program according to the embodiments is recorded.

The term "processor" as used herein refers to a circuit such as, for example, a central processing unit (CPU), a graphics processing unit (GPU), an application specific integrated circuit (ASIC), and a programmable logic device (PLD). Examples of PLD include a simple programmable logic device (SPLD), a complex programmable logic device (CPLD), and a field programmable gate array (FPGA). The processor realizes, for example, the function according to the embodiments by reading out a computer program stored in a storage circuit or a storage device and executing the computer program.

FIG. 1A shows a block diagram of an example of a configuration of the ophthalmic information processing apparatus according to the embodiments.

The ophthalmic information processing apparatus 1000 according to the embodiments outputs two or more confidence score information OUT-1 to OUT-m (m is an integer of two or more) from two or more images IMG-1 to IMG-n (n is an integer of two or more) of the subject's eye and background data BG of the subject or the subject's eye.

The images IMG-1 to IMG-n include one or more OCT images generated from the three-dimensional OCT data obtained by performing OCT on the subject's eye and a color fundus image acquired using imaging optical system. The one or more images include at least one of a B-scan image in a horizontal direction (lateral direction, x direction, first direction) passing through a representative position of an optic disc, a B-scan image in a vertical direction (longitudinal direction, y direction, second direction intersecting the first direction) passing through the representative position of the optic disc, a B-scan image in the vertical direction passing through a representative position of a fovea, a projection image, an en-face image, and a B-scan image passing through midway between the representative position of the optic disc and the representative position of the fovea. Examples of the representative position of the optic disc include a center of the disc, and a center of gravity of the optic disc. Examples of the representative position the fovea include a center of the fovea, and a center of gravity of the fovea.

The background data BG includes at least one of an age of the subject, a gender of the subject, an axial length of the subject's eye, an MD (Mean Defect) value of the subject's eye, an equivalent spherical power of the subject's eye, an optic disc tissue blood flow value (MT (Mean of Tissue area) value) of the subject's eye, a minimum intraocular pressure value over a past predetermined period, a maximum intraocular pressure value over a past predetermined period, and an average intraocular pressure value over a past predetermined period. The axial length is acquired using a known optical coherence tomography or a known axial length measuring apparatus. The MD value is a value indication the degree of defect in the field of vision and is acquired using a perimeter. The equivalent spherical power is acquired using a known eye refractive power measuring apparatus. The MT value is acquired using a known Laser Speckle Flowgraphy (LSFG). The minimum intraocular pressure value over a past predetermined period may be, for example, a minimum intraocular pressure value over the past year. The maximum intraocular pressure value over a past predetermined period may be, for example, a maximum intraocular pressure value over the past year. The average intraocular pressure value over a past predetermined period may be, for example, an average intraocular pressure value over the past year.

In some embodiments, the ophthalmic information processing apparatus 1000 performs feature selection processing based on the respective distributions of a plurality of background data including the background data BG described above, and outputs the two or more confidence score information OUT-1 to OUT-m using the background data selected by performing the feature selection processing.

The ophthalmic information processing apparatus 1000 includes a feature amount extractor 1100 and a classifier 1200. The feature amount extractor 1100 includes extractors 1110-1 to 1110-n corresponding to each of the images IMG-1 to IMG-n, and extracts feature amounts for each of the images IMG-1 to IMG-n. The feature amounts extracted by the feature amount extractor 1100 may be confidence score information for estimating the classification result according to the Nicolela's classification of each of the images IMG-1 to IMG-n. The classifier 1200 outputs the two or more confidence score information OUT-1 to OUT-m, based on the feature amounts of each of the images IMG-1 to IMG-n extracted by the feature amount extractor 1100 and the background data BG.

Figure 1B:
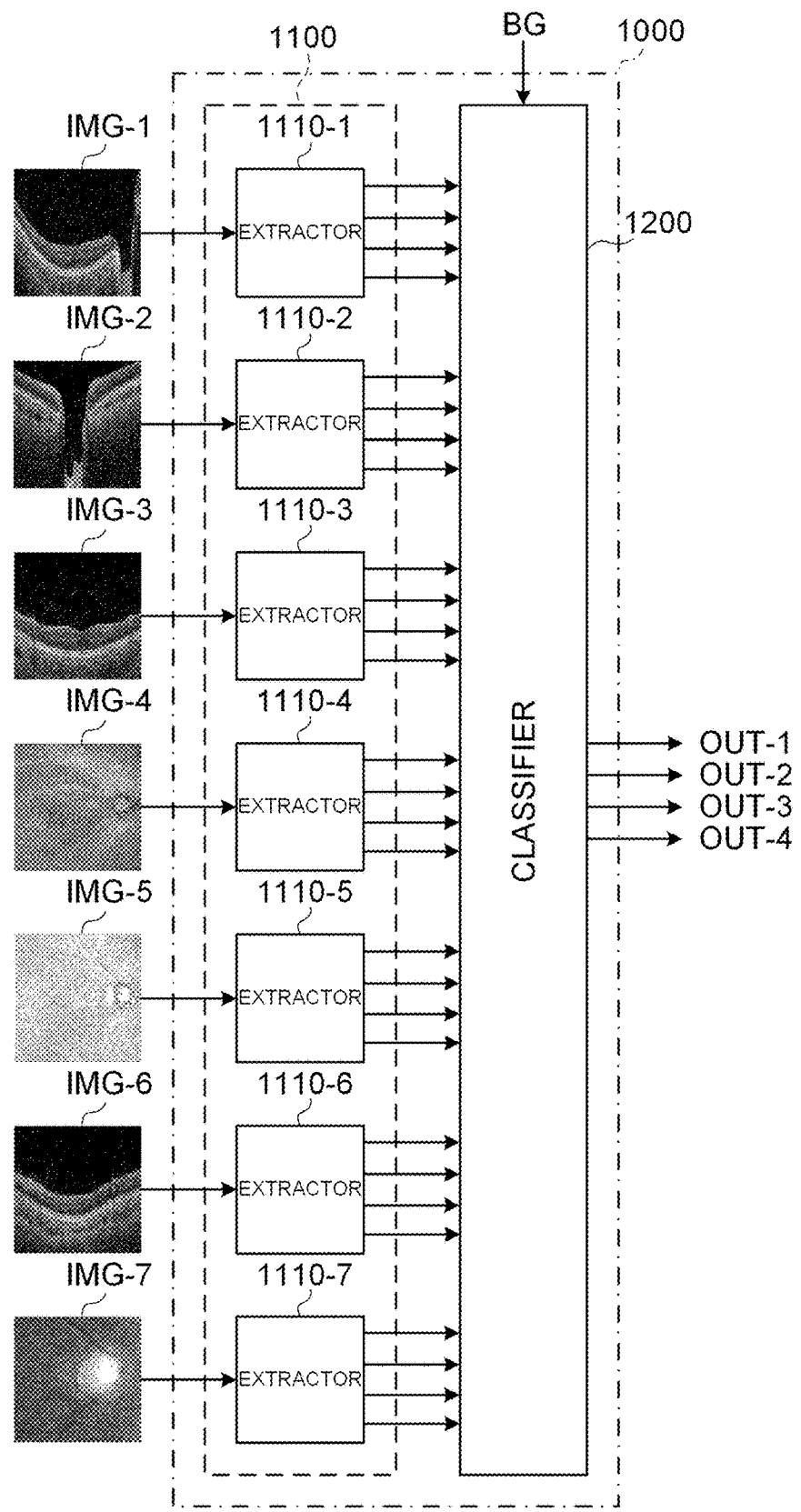
FIG. 1B is a schematic diagram illustrating an example of the configuration of the ophthalmic information processing apparatus according to the embodiments.

FIG. 1B shows a block diagram of a specific example of a configuration of the ophthalmic information processing apparatus 1000 in FIG. 1A. In FIG. 1B, like reference numerals designate like parts as in FIG. 1A. The same description may not be repeated.

The ophthalmic information processing apparatus 1000 outputs the confidence score information OUT-1 to OUT-4 for estimating the classification result(s) of the pathological condition of glaucoma according to Nicolela's classification from the images IMG-1 to IMG-7 of the subject's eye and the background data BG.

The image IMG-1 is a B-scan image in the horizontal direction passing through the center of the optic disc. The image IMG-2 is a B-scan image in the vertical direction passing through the center of the optic disc. The image IMG-3 is a B-scan image in the vertical direction passing through the center of the fovea. The image IMG-4 is a projection image. The image IMG-5 is an en-face image. The image IMG-6 is a B-scan image passing through midway between the center of the optic disc and the center of the fovea. The image IMG-7 is a color fundus image. The images IMG-1 to IMG-6 are acquired from the three-dimensional OCT data of the subject's eye. The image IMG-7 is acquired using a fundus camera.

In some embodiments, a scaling processing or a cropping processing is performed as preprocessing before being input to the ophthalmic information processing apparatus 1000 so as to make each of the images IMG-1 to IMG-7 have the same image size. In some embodiments, as this preprocessing, at least one of the scaling processing, the cropping processing, and shift processing is performed on the B-scan image(s) among the images IMG-1 to IMG-7 so as to match the reference positions in the images. In some embodiments, as this preprocessing, at least one of the scaling processing, the cropping processing, and the shift processing is performed on the B-scan image(s) among the images IMG-1 to IMG-7 so as to match at least one of the size and the position of a characteristic site depicted in common. In some embodiments, as this preprocessing, at least one of the scaling processing, the cropping processing, and the shift processing is performed on the en-face image, the projection image, and the color fundus image among the images IMG-1 to IMG-7 so as to match the reference positions in the images. In some embodiments, as this preprocessing, at least one of the scaling processing, the cropping processing, and shift processing is performed on the en-face image, the projection image, and the color fundus image among images IMG-1 to IMG-7 so as to match at least one of the size and the position of a characteristic site depicted in common.

The background data BG includes, for example, the age of the subject, the axial length of the subject's eye, the MD value of the subject's eye, the equivalent spherical power of the subject's eye, the MT value of the subject's eye, and the minimum intraocular pressure value over a past predetermined period.

The confidence score information OUT-1 to OUT-4 includes information representing the confidence score of each of four types of the pathological condition of glaucoma according to Nicolela's classification.

In Nicolela's classification, the four types (Focal Ischemia type, Myopic type, Senile Sclerotic type, General Enlargement type) are defined based on the shape of the optic disc. Focal Ischemia (FI) type is a type in which a notch appears in part of the rim and a focal defect in the optic nerve fiber layer can be observed. Focal Ischemia type is often more common in women and is often accompanied by migraine headache and attack. Myopic (MY) type is a type in which the optic disc is tilted and a crescent-shaped parapapillary atrophy (PPA) with a temporal cupping can be observed. Myopic type is often more common in young people and is often accompanied by myopia. Senile Sclerotic (SS) type is a type in which the optic disc is round, a cupping is shallow, and Halo can be observed around the optic disc. Senile Sclerotic type is often more common in aged persons and is often accompanied by cardiovascular disturbance. General Enlargement (GE) type is a type in which a cupping is large, deep, and circular. General Enlargement type is often more common in eyes of subjects with high intraocular pressure.

The confidence score information OUT-1 is information representing that glaucoma developing in the subject's eye is Focal Ischemia type (FI). The confidence score information OUT-2 is information representing that glaucoma developing in the subject's eye is Myopic type (MY). The confidence score information OUT-3 is information representing that glaucoma developing in the subject's eye is Senile Sclerotic type (SS). The confidence score information OUT-4 is information representing that glaucoma developing in the subject's eye is General Enlargement type (GE).

In this case, the feature amount extractor 1100 includes extractors 1110-1 to 1110-7 corresponding to each of the images IMG-1 to IMG-7, and extracts feature amounts for each of the images IMG-1 to IMG-7. The classifier 1200 outputs the confidence score information OUT-1 to OUT-4 based on the feature amounts of each of the images IMG-1 to IMG-7 extracted by the feature amount extractor 1100 and the background data BG.

The extractor 1110-1 extracts the feature amount(s) of the image IMG-1 of the subject's eye using an individual estimation model (learned model) obtained by performing supervised machine learning. Here, in the supervised machine learning, the images IMG-1 for training are used as training data, and the classification results (FI type, MY type, SS type, GE type) of the pathological condition of glaucoma determined by doctor(s) or other person(s) according to Nicolela's classification are used as teaching data. The extractor 1110-2 extracts the feature amount(s) of the image IMG-2 of the subject's eye using an individual estimation model obtained by performing supervised machine learning. Here, in the supervised machine learning, the images IMG-2 for training are used as training data, and the classification results of the pathological condition of glaucoma determined by doctor(s) or other person(s) according to Nicolela's classification are used as teaching data. The extractor 1110-3 extracts the feature amount(s) of the image IMG-3 of the subject's eye using an individual estimation model obtained by performing supervised machine learning. Here, in the supervised machine learning, the images IMG-3 for training are used as training data, and the classification results of the pathological condition of glaucoma determined by doctor(s) or other person(s) according to Nicolela's classification are used as teaching data. The extractor 1110-4 extracts the feature amount(s) of the image IMG-4 of the subject's eye using an individual estimation model obtained by performing supervised machine learning. Here, in the supervised machine learning, the images IMG-4 for training are used as training data, and the classification results of the pathological condition of glaucoma determined by doctor(s) or other person(s) according to Nicolela's classification are used as teaching data. The extractor 1110-5 extracts the feature amount(s) of the image IMG-5 of the subject's eye using an individual estimation model obtained by performing supervised machine learning. Here, in the supervised machine learning, the images IMG-5 for training are used as training data, and the classification results of the pathological condition of glaucoma determined by doctor(s) or other person(s) according to Nicolela's classification are used as teaching data. The extractor 1110-6 extracts the feature amount(s) of the image IMG-6 of the subject's eye using an individual estimation model obtained by performing supervised machine learning. Here, in the supervised machine learning, the images IMG-6 for training are used as training data, and the classification results of the pathological condition of glaucoma determined by doctor(s) or other person(s) according to Nicolela's classification are used as teaching data. The extractor 1110-7 extracts the feature amount(s) of the image IMG-7 of the subject's eye using an individual estimation model obtained by performing supervised machine learning. Here, in the supervised machine learning, the images IMG-7 for training are used as training data, and the classification results of the pathological condition of glaucoma determined by doctor(s) or other person(s) according to Nicolela's classification are used as teaching data.

The classifier 1200 outputs the confidence score information OUT-1 to OUT-4 using a classification model (learned model) obtained by performing supervised machine learning. Here, in the supervised machine learning, the feature amounts of each of the images IMG-1 to IMG-7 for training and the background data BG are used as training data, and the classification results of the pathological condition of glaucoma determined by doctor(s) or other person(s) according to Nicolela's classification are used as teaching data.

Hereinafter, a case where the ophthalmic apparatus, which has the function of the optical coherence tomography and the function of the fundus camera, has the function of the ophthalmic information processing apparatus 1000 according to the embodiments will be specifically described. However, the function of the ophthalmic information processing apparatus 1000 according to the embodiments can be applied to a stand-alone optical coherence tomography.

Hereinafter, an ophthalmic apparatus capable of performing OCT measurement on the fundus of the subject's eye will be described as an example. However, the ophthalmic apparatus according to the embodiments may be capable of performing OCT measurement on an anterior segment of the subject's eye. In some embodiments, a measurement range of the OCT measurement and/or a site of the OCT measurement are/is changed by moving a lens for changing focal position of measurement light. In some embodiments, the ophthalmic apparatus has a configuration capable of performing OCT measurement on the fundus, OCT measurement on the anterior segment, and OCT measurement on the whole eyeball including the fundus and the anterior segment, by adding one or more attachments (objective lens, front lens, etc.). In some embodiments, in the ophthalmic apparatus for measuring fundus, OCT measurement is performed on the anterior segment, by making the measurement light incident on the subject's eye, the measurement light having been converted into a parallel light flux by arranging a front lens between the objective lens and the subject's eye.

<Configuration>
[Optical System]

Figure 2:
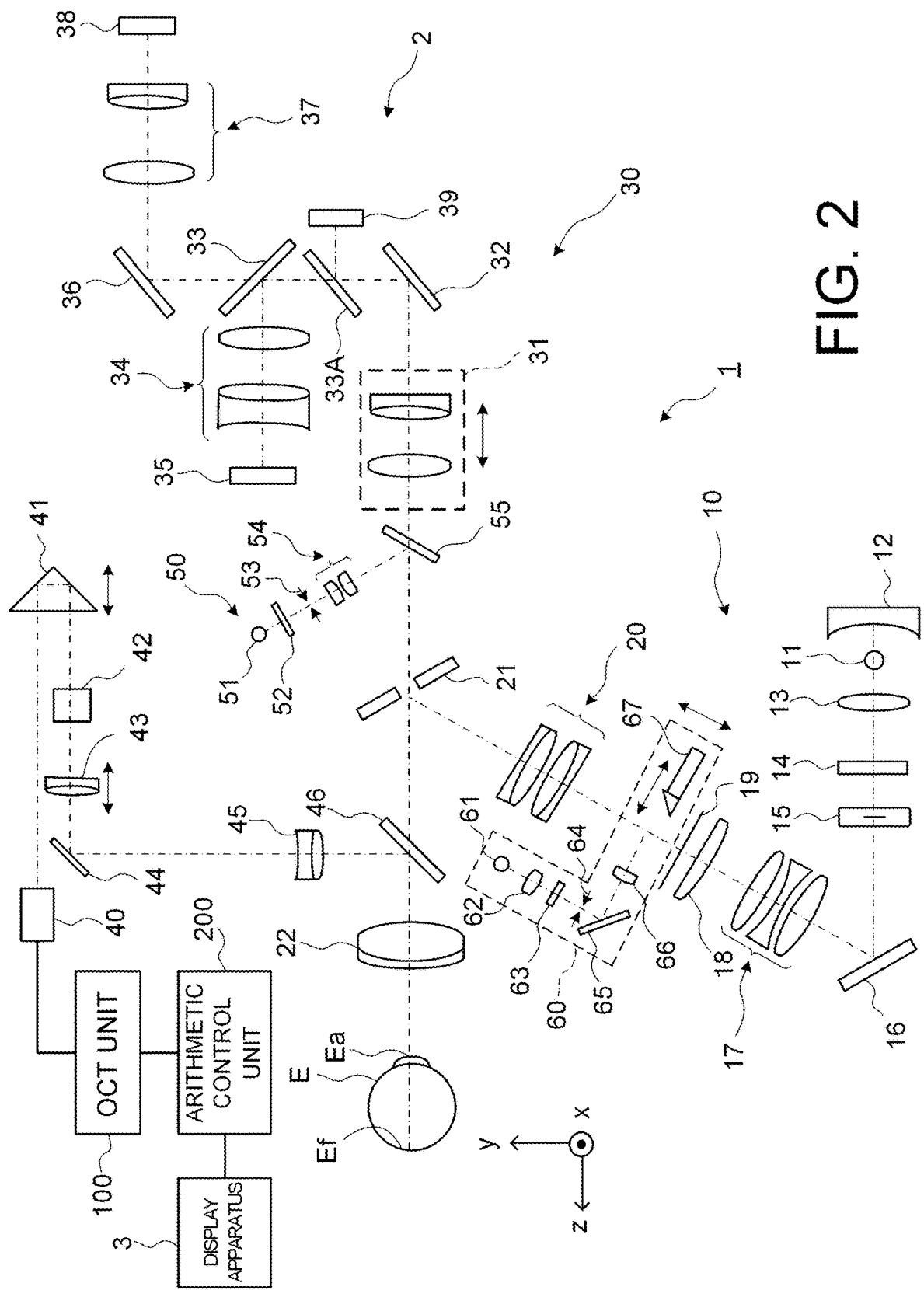
FIG. 2 is a schematic diagram illustrating an example of a configuration of an optical system of an ophthalmic apparatus according to the embodiments.

As shown in FIG. 2, the ophthalmic apparatus 1 includes a fundus camera unit 2, an OCT unit 100, and an arithmetic control unit 200. The fundus camera unit 2 is provided with an optical system and a mechanism for acquiring front images of a subject's eye E. The OCT unit 100 is provided with a part of an optical system and a mechanism for performing OCT. Another part of the optical system and the mechanism for performing OCT are provided in the fundus camera unit 2. The arithmetic control unit 200 includes one or more processors for performing various kinds of arithmetic processing and control processing. In addition to these elements, an arbitrary element or a unit, such as a member (chin rest, forehead pad, etc.) for supporting a face of the subject, a lens unit (for example, an attachment for an anterior segment OCT) for switching the target site of OCT, and the like, may be provided in the ophthalmic apparatus 1. In some embodiments, the lens unit is configured to be manually inserted and removed between the subject's eye E and an objective lens 22 described below. In some embodiments, the lens unit is configured to be automatically inserted and removed between the subject's eye E and the objective lens 22 described below, under the control of the controller 210 described below.

[Fundus Camera Unit]

The fundus camera unit 2 is provided with an optical system for imaging (photographing) a fundus Ef of the subject's eye E. An image (called fundus image, fundus photograph, etc.) of the fundus Ef to be obtained is a front image such as an observation image, a captured image. The observation image is obtained by moving image shooting using near infrared light. The captured image may be a still image using flash light. Furthermore, the fundus camera unit 2 can obtain the front image (anterior segment image) by photographing (imaging) an anterior segment Ea of the subject's eye E.

The fundus camera unit 2 includes an illumination optical system 10 and an imaging (photographing) optical system 30. The illumination optical system 10 irradiates illumination light onto the subject's eye E. The imaging optical system 30 detects returning light of the illumination light from the subject's eye E. Measurement light from the OCT unit 100 is guided to the subject's eye E through an optical path in the fundus camera unit 2. Returning light of the measurement light is guided to the OCT unit 100 through the same optical path.

Light (observation illumination light) emitted from the observation light source 11 of the illumination optical system 10 is reflected by a reflective mirror 12 having a curved reflective surface, and becomes near-infrared light after being transmitted through a visible cut filter 14 via a condenser lens 13. Further, the observation illumination light is once converged near an imaging light source 15, is reflected by a mirror 16, and passes through relay lenses 17 and 18, a diaphragm 19, and a relay lens 20. Then, the observation illumination light is reflected on the peripheral part (the surrounding area of a hole part) of a perforated mirror 21, is transmitted through a dichroic mirror 46, and is refracted by the objective lens 22, thereby illuminating the subject's eye E (fundus Ef or anterior segment Ea). Returning light of the observation illumination light reflected from the subject's eye E is refracted by the objective lens 22, is transmitted through the dichroic mirror 46, passes through the hole part formed in the center region of the perforated mirror 21, and is transmitted through a dichroic mirror 55. The returning light transmitted through the dichroic mirror 55 travels through a photography focusing lens 31 and is reflected by a mirror 32. Further, this returning light is transmitted through a half mirror 33A, is reflected by a dichroic mirror 33, and forms an image on the light receiving surface of an image sensor 35 by a condenser lens 34. The image sensor 35 detects the returning light at a predetermined frame rate. It should be noted that the focus of the imaging optical system 30 is adjusted so as to coincide with the fundus Ef or the anterior segment Ea.

Light (imaging illumination light) emitted from the imaging light source 15 is irradiated onto the fundus Ef through the same route as that of the observation illumination light. Returning light of the imaging illumination light from the subject's eye E is guided to the dichroic mirror 33 through the same route as that of the observation illumination light, is transmitted through the dichroic mirror 33, is reflected by a mirror 36, and forms an image on the light receiving surface of the image sensor 38 by a condenser lens 37. For example, the color fundus image IMG-7 described below is acquired using the image sensor 38.

A liquid crystal display (LCD) 39 displays a fixation target and a visual target used for visual acuity measurement. Part of light flux output from the LCD 39 is reflected by the half mirror 33A, is reflected by the mirror 32, travels through the photography focusing lens 31 and the dichroic mirror 55, and passes through the hole part of the perforated mirror 21. The light flux (beam) having passed through the hole part of the perforated mirror 21 is transmitted through the dichroic mirror 46, and is refracted by the objective lens 22, thereby being projected onto the fundus Ef.

By changing the display position of the fixation target on the screen of the LCD 39, the fixation position of the subject's eye E can be changed. Examples of the fixation position include a fixation position for acquiring an image centered at a macula, a fixation position for acquiring an image centered at an optic disc, a fixation position for acquiring an image centered at a fundus center between the macula and the optic disc, a fixation position for acquiring an image of a site (fundus peripheral part) far away from the macula, and the like. The ophthalmic apparatus 1 according to some embodiments includes GUI (Graphical User Interface) and the like for designating at least one of such fixation positions. The ophthalmic apparatus 1 according to some embodiments includes GUI etc. for manually moving the fixation position (display position of the fixation target).

The configuration for presenting the movable fixation target to the subject's eye E is not limited to the display device such LCD or the like. For example, the movable fixation target can be generated by selectively turning on a plurality of light sources of a light source array (light emitting diode (LED) array or the like). Alternatively, the movable fixation target can be generated using one or more movable light sources.

Further, the ophthalmic apparatus 1 may be provided with one or more external fixation light sources. One of the one or more external fixation light sources can project fixation light onto a fellow eye of the subject's eye E. A projected position of the fixation light on the fellow eye can be changed. By changing the projected position of the fixation light on the fellow eye, the fixation position of the subject's eye E can be changed. The fixation position projected by the external fixation light source(s) may be the same as the fixation position of the subject's eye E using the LCD 39. For example, the movable fixation target can be generated by selectively turning on the plurality of external fixation light sources. Alternatively, the movable fixation target can be generated using one or more movable external fixation light sources.

The alignment optical system 50 generates an alignment indicator for alignment of the optical system with respect to the subject's eye E. Alignment light emitted from an LED 51 travels through the diaphragms 52 and 53 and the relay lens 54, is reflected by the dichroic mirror 55, and passes through the hole part of the perforated mirror 21. The light having passed through the hole part of the perforated mirror 21 is transmitted through the dichroic mirror 46, and is projected onto the subject's eye E by the objective lens 22. Corneal reflection light of the alignment light is guided to the image sensor 35 through the same route as the returning light of the observation illumination light. Manual alignment or automatic alignment can be performed based on the received light image (alignment indicator image) thereof.

The focus optical system 60 generates a split indicator for adjusting the focus with respect to the subject's eye E. The focus optical system 60 is movable along an optical path (illumination optical path) of the illumination optical system 10 in conjunction with the movement of the photography focusing lens 31 along an optical path (imaging optical path) of the imaging optical system 30. The reflection rod 67 can be inserted and removed into and from the illumination optical path. To perform focus adjustment, the reflective surface of the reflection rod 67 is arranged in a slanted position on the illumination optical path. Focus light emitted from an LED 61 passes through a relay lens 62, is split into two light beams by a split indicator plate 63, passes through a two-hole diaphragm 64, is reflected by a mirror 65, and is reflected after an image is once formed on the reflective surface of the reflection rod 67 by a condenser lens 66. Further, the focus light travels through the relay lens 20, is reflected by the perforated mirror 21, is transmitted through the dichroic mirror 46, and is refracted by the objective lens 22, thereby being projected onto the fundus Ef. Fundus reflection light of the focus light is guided to the image sensor 35 through the same route as the corneal reflection light of the alignment light. Manual focus or automatic focus can be performed based on the received light image (split indicator image) thereof.

The dichroic mirror 46 combines an optical path for imaging and an optical path for OCT (optical path of the interference optical system). The dichroic mirror 46 reflects light of wavelength band used in OCT, and transmits light for fundus imaging. The optical path for OCT (optical path of measurement light) is provided with, in order from the OCT unit 100 side to the dichroic mirror 46 side, a collimator lens unit 40, an optical path length changing unit 41, an optical scanner 42, an OCT focusing lens 43, a mirror 44, and a relay lens 45.

The optical path length changing unit 41 is configured to move in a direction indicated by the arrow shown in FIG. 2, thereby changing the length of the optical path for OCT. This change in the optical path length is used for correcting the optical path length according to the axial length, adjusting the interference state, or the like. The optical path length changing unit 41 includes a corner cube and a mechanism for moving the corner cube.

The optical scanner 42 is disposed at a position optically conjugate to the pupil of the subject's eye E. The optical scanner 42 deflects the measurement light LS traveling along the OCT optical path. The optical scanner 42 can deflect the measurement light LS in a one-dimensionally or two-dimensional manner.

In case of deflecting the measurement light LS in a one-dimensionally manner, the optical scanner 42 includes a galvano scanner capable of deflecting the measurement light LS within a predetermined deflection angle range in a predetermined deflection direction. In case of deflecting the measurement light LS in a two-dimensionally manner, the optical scanner 42 includes a first galvano scanner and a second galvano scanner. The first galvano scanner deflects the measurement light LS so as to scan an imaging site (fundus Ef or the anterior segment Ea) in a horizontal direction orthogonal to the optical axis of the interference optical system (OCT optical system). The second galvano scanner deflects the measurement light LS deflected by the first galvano scanner so as to scan the imaging site in a vertical direction orthogonal to the optical axis of the interference optical system. Examples of scan mode with the measurement light LS performed by the optical scanner 42 include horizontal scan, vertical scan, cross scan, radial scan, circle scan, concentric scan, helical (spiral) scan, and the like.

The OCT focusing lens 43 is moved along the optical path of the measurement light LS in order to perform focus adjustment of the optical system for OCT. The OCT focusing lens 43 can move within a moving range. The moving range includes a first lens position for placing the focal position of the measurement light LS at the fundus Ef or near the fundus Ef of the subject's eye E and a second lens position for making the measurement light LS projected onto the subject's eye E a parallel light beam. The movement of the photography focusing lens 31, the movement of the focus optical system 60, and the movement of the OCT focusing lens 43 can be controlled in conjunction with each other.

[October Unit]

Figure 3:
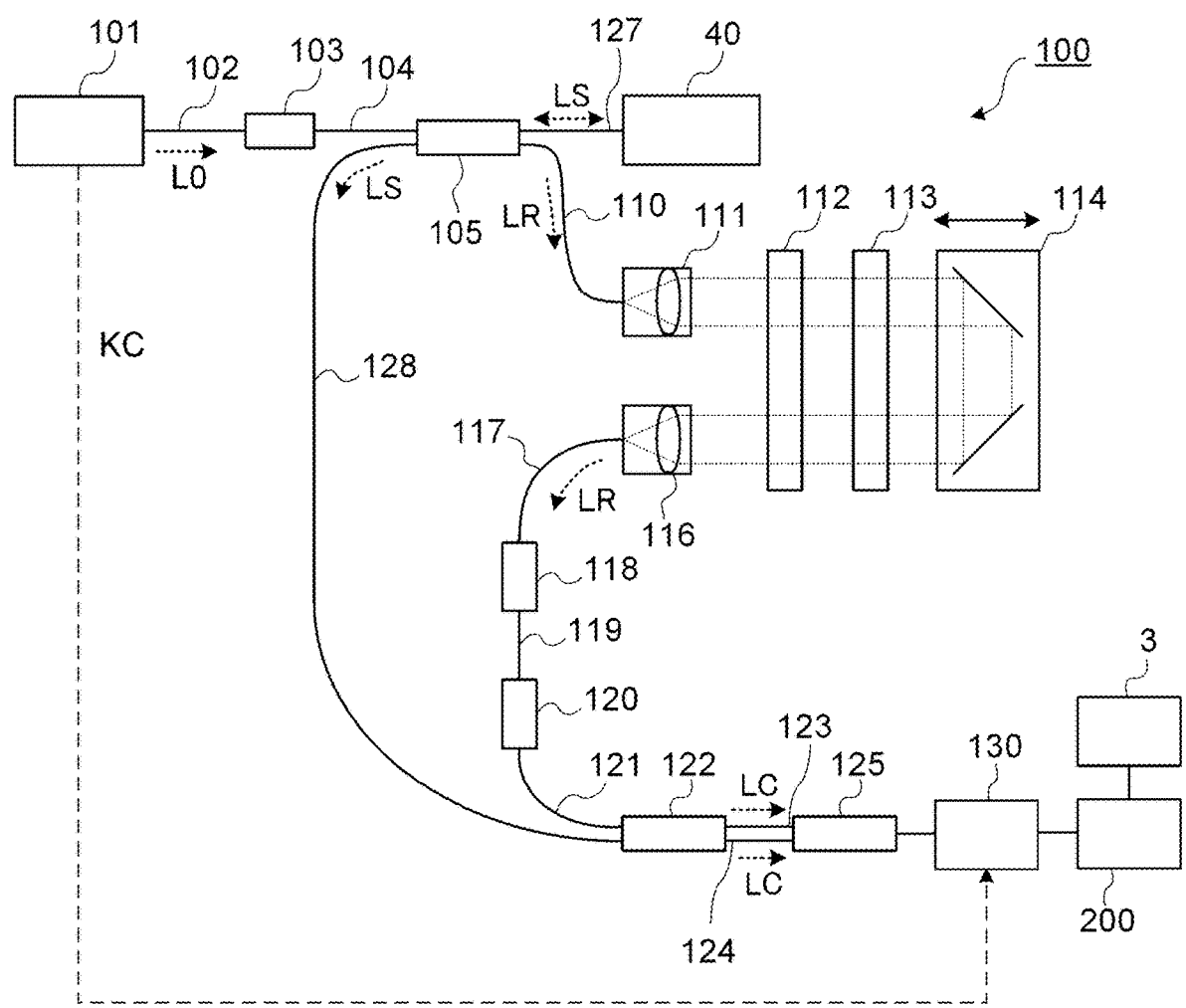
FIG. 3 is a schematic diagram illustrating an example of a configuration of an optical system of the ophthalmic apparatus according to the embodiments.

An example of the configuration of the OCT unit 100 is shown in FIG. 3. The OCT unit 100 is provided with an optical system for acquiring OCT images of the subject's eye E. This optical system is an interference optical system that splits light from a wavelength sweeping type (i.e., a wavelength scanning type) light source into measurement light and reference light, makes the measurement light returning from the subject's eye E and the reference light having traveled through the reference optical path interfere with each other to generate interference light, and detects the interference light. The detection result of the interference light obtained by the interference optical system (i.e., the detection signal) is an interference signal indicating the spectrum of the interference light, and is sent to the arithmetic control unit 200.

Like swept source type ophthalmic apparatuses commonly used, the light source unit 101 includes a wavelength sweeping type (i.e., a wavelength scanning type) light source capable of sweeping (scanning) the wavelengths of emitted light. The wavelength sweeping type light source includes a laser light source that includes a resonator. The light source unit 101 temporally changes the output wavelengths within the near-infrared wavelength bands that cannot be visually recognized with human eyes.

Light L0 output from the light source unit 101 is guided to the polarization controller 103 through the optical fiber 102, and the polarization state of the light L0 is adjusted. The polarization controller 103, for example, applies external stress to the looped optical fiber 102 to thereby adjust the polarization state of the light L0 guided through the optical fiber 102.

The light L0 whose the polarization state has been adjusted by the polarization controller 103 is guided to the fiber coupler 105 through the optical fiber 104, and is split into the measurement light LS and the reference light LR.

The reference light LR is guided to the collimator 111 through the optical fiber 110. The reference light LR is converted into a parallel light flux by the collimator 111. Then, the reference light LR is guided to the optical path length changing unit 114 via an optical path length correction member 112 and a dispersion compensation member 113. The optical path length correction member 112 acts so as to match the optical path length of the reference light LR with the optical path length of the measurement light LS. The dispersion compensation member 113 acts so as to match the dispersion characteristics between the reference light LR and the measurement light LS. The optical path length changing unit 114 includes, for example, a corner cube and a movement mechanism for moving the corner cube and can move the corner cube in the incident direction of the reference light LR using the movement mechanism. Thereby, the optical path length of the reference light LR is changed.

The reference light LR that has traveled through the optical path length changing unit 114 passes through the dispersion compensation member 113 and the optical path length correction member 112, is converted from the parallel light flux to the convergent light flux by a collimator 116, and enters an optical fiber 117. The reference light LR that has entered the optical fiber 117 is guided to a polarization controller 118, and the polarization state of the reference light LR is adjusted. Then the reference light LR is guided to an attenuator 120 through an optical fiber 119, and the light amount of the reference light LR is adjusted. After that, the reference light LR is guided to a fiber coupler 122 through an optical fiber 121.

Meanwhile, the measurement light LS generated by the fiber coupler 105 is guided through an optical fiber 127, and is made into a parallel light beam by the collimator lens unit 40. The measurement light LS made into the parallel light beam travels through the optical path length changing unit 41, the optical scanner 42, the OCT focusing lens 43, the mirror 44, and the relay lens 45. The measurement light LS having traveled through the relay lens 45 is reflected by the dichroic mirror 46, is refracted by the objective lens 22, and is irradiated onto the subject's eye E. The measurement light LS is scattered and reflected at various depth positions of the subject's eye E. Returning light of the measurement light LS from the subject's eye E advances in the same path as the forward path in the opposite direction, is guided to the fiber coupler 105, and then reaches the fiber coupler 122 via the optical fiber 128.

The fiber coupler 122 combines (interferes) the measurement light LS incident through the optical fiber 128 and the reference light LR incident through the optical fiber 121 to generate interference light. The fiber coupler 122 splits the interference light at a predetermined splitting ratio (e.g., 1:1) to generate a pair of interference light LC. The pair of interference light LC is guided to a detector 125 through optical fibers 123 and 124, respectively.

The detector 125 is, for example, a balanced photodiode that includes a pair of photodetectors for respectively detecting the pair of interference light LC and outputs the difference between the pair of detection results obtained by the pair of photodetectors. The detector 125 sends the detection result (i.e., interference signal) to the DAQ (Data Acquisition System) 130. A clock KC is supplied from the light source unit 101 to the DAQ 130. The clock KC is generated in the light source unit 101 in synchronization with the output timing of each wavelength sweeping (scanning) within a predetermined wavelength range performed by the wavelength sweeping type light source. For example, the light source unit 101 optically delays one of the two pieces of branched light obtained by branching the light L0 of each output wavelength, and then generates the clock KC based on the result of the detection of the combined light of the two pieces of branched light. The DAQ 130 performs sampling of the detection result obtained by the detector 125 based on the clock KC. The DAQ 130 sends the result of the sampling of the detection result obtained by the detector 125 to the arithmetic control unit 200. For example, the arithmetic control unit 200 performs the Fourier transform etc. on the spectral distribution based on the detection result obtained by the detector 125 for each series of wavelength scanning (i.e., for each A-line). With this, the reflection intensity profile for each A-line is formed. In addition, the arithmetic control unit 200 forms image data by applying imaging processing to the reflection intensity profiles for the respective A-lines.

The configuration shown in FIG. 2 and FIG. 3 includes both the optical path length changing unit 41 that changes the length of the optical path of the measurement light LS (i.e., measurement optical path or measurement arm) and the optical path length changing unit 114 that changes the length of the optical path of the reference light LR (i.e., reference optical path or reference arm). However, any one of the optical path length changing units 41 and 114 may be provided. The difference between the measurement optical path length and the reference optical path length can be changed by using other optical members.

[Arithmetic Control Unit]

The arithmetic control unit 200 analyzes the detection signals fed from the DAQ 130 to form an OCT image of the subject's eye E. The arithmetic processing therefor is performed in the same manner as in the conventional swept source type OCT apparatus.

In addition, the arithmetic control unit 200 controls each part of the fundus camera unit 2, the display apparatus 3, and the OCT unit 100.

Also, as the control of the fundus camera unit 2, the arithmetic control unit 200 performs following controls: the operation control of the observation light source 11, the operation control of the imaging light source 15 and the operation control of the LEDs 51 and 61; the operation control of the LCD 39; the movement control of the photography focusing lens 31; the movement control of the OCT focusing lens 43; the movement control of the reflection rod 67; the movement control of the focus optical system 60; the movement control of the optical path length changing unit 41; the operation control of the optical scanner 42, and the like.

As the control of the display apparatus 3, the arithmetic control unit 200 controls the display apparatus 3 to display the OCT image or the fundus image of the subject's eye E.

As the control of the OCT unit 100, the arithmetic control unit 200 controls: the operation of the light source unit 101; the operation of the optical path length changing unit 114; the operations of the attenuator 120; the operation of the polarization controllers 103 and 118; the operation of the detector 125; the operation of the DAQ 130; and the like.

As in the conventional computer, the arithmetic control unit 200 includes a processor, RAM, ROM, hard disk drive, and communication interface, for example. A storage device such as the hard disk drive stores a computer program for controlling the ophthalmic apparatus 1. The arithmetic control unit 200 may include various kinds of circuitry such as a circuit board for forming OCT images. In addition, the arithmetic control unit 200 may include an operation device (or an input device) such as a keyboard and a mouse, and a display device such as an LCD.

The fundus camera unit 2, the display apparatus 3, the OCT unit 100, and the arithmetic control unit 200 may be integrally provided (i.e., in a single housing), or they may be separately provided in two or more housings.

[Processing System]

Figure 4:
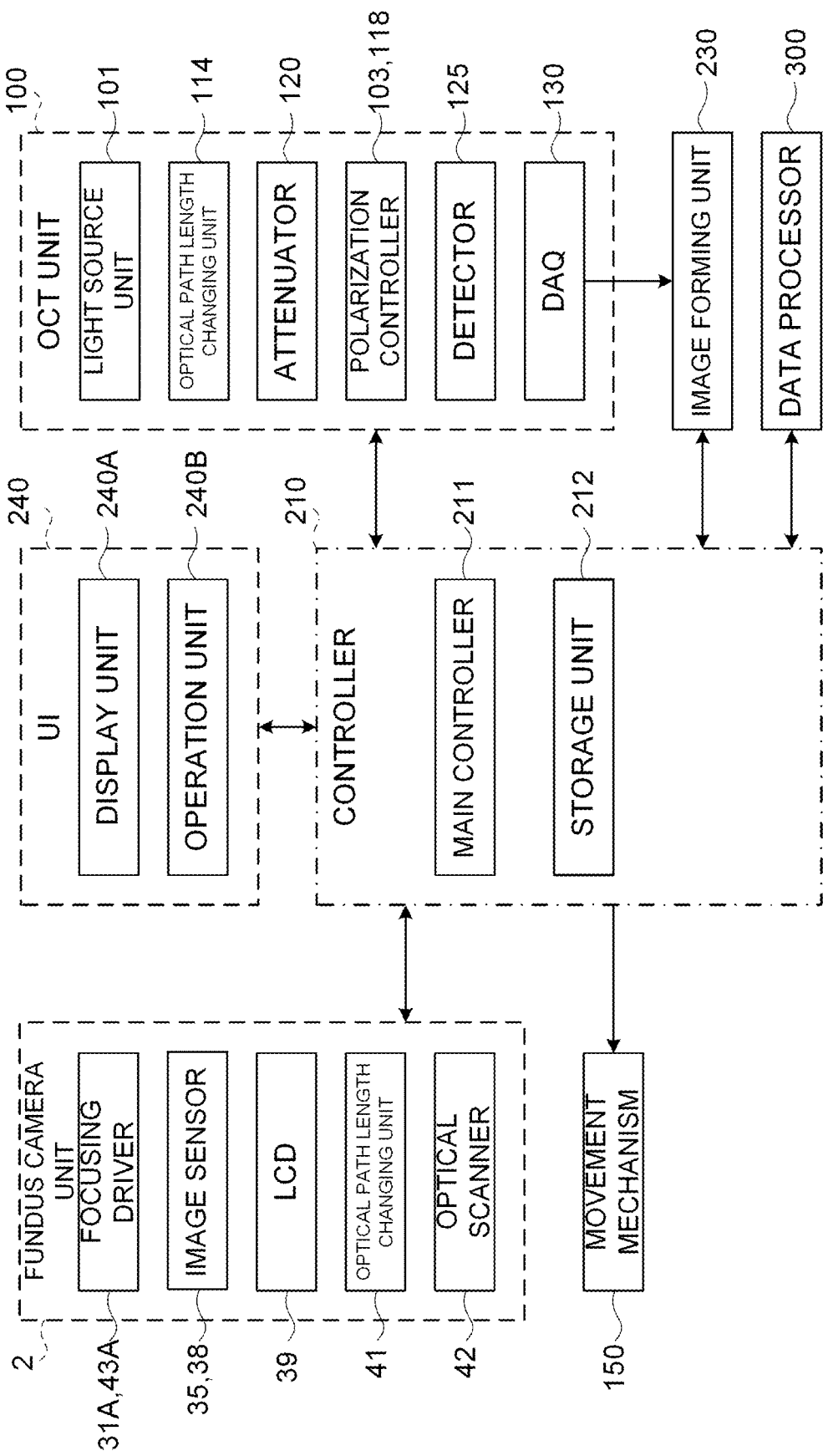
FIG. 4 is a schematic diagram illustrating an example of a configuration of a processing system of the ophthalmic apparatus according to the embodiments.

FIG. 4 illustrates an example of a configuration of a processing system of the ophthalmic apparatus 1. In FIG. 4, a part of the components included in the ophthalmic apparatus 1 is omitted.

The arithmetic control unit 200 includes a controller 210, and controls each part of the fundus camera unit 2, the display apparatus 3, and the OCT unit 100.

(Controller)

The controller 210 executes various controls. The controller 210 includes a main controller 211 and a storage unit 212.

(Main Controller)

The main controller 211 includes a processor and controls each part of the ophthalmic apparatus 1. For example, the main controller 211 controls components of the fundus camera unit 2 such as focusing drivers 31A and 43A, the image sensors 35 and 38, the LCD 39, the optical path length changing unit 41, the optical scanner 42, and the movement (movement mechanism 150) for moving the optical system. Further, the main controller 211 controls components of the OCT unit 100 such as the light source unit 101, the optical path length changing unit 114, the attenuator 120, the polarization controllers 103 and 118, the detector 125, and the DAQ 130.

For example, the main controller 211 controls the LCD 39 to display the fixation target at a position on the screen of the LCD 39 corresponding to the fixation position set manually or automatically. Moreover, the main controller 211 can change the display position of the fixation target displayed on the LCD 39 (in a continuous manner or in a phased manner). Thereby, the fixation target can be moved (that is, the fixation position can be changed). The display position of the fixation target and a movement mode of the fixation target are set manually, or automatically. Manual setting is performed using GUI, for example. Automatic setting is performed by the data processor 300, for example.

The focusing driver 31A moves the photography focusing lens 31 in an optical axis direction of the imaging optical system 30, and moves the focus optical system 60 in an optical axis direction of the illumination optical system 10. As a result, the focusing position of the imaging optical system 30 is changed. In some embodiments, the focusing driver 31A includes a dedicated mechanism for moving the photography focusing lens 31 and a dedicated mechanism for moving the focus optical system 60. The focusing driver 31A is controlled when performing focus adjustment or the like.

The focusing driver 43A moves the OCT focusing lens 43 in an optical axis direction of the measurement optical path. As a result, the focusing position of the measurement light LS is changed. For example, the focus position of the measurement light LS can be arranged at the fundus Ef or near the fundus Ef by moving the OCT focusing lens 43 to the first lens position. For example, the focus position of the measurement light LS can be arranged at a far point position by moving the OCT focusing lens 43 to the second lens position. The focus position of the measurement light LS corresponds to the depth position (z position) of the beam waist of the measurement light LS.

The movement mechanism 150 three-dimensionally moves at least the fundus camera unit 2 (optical system), for example. In a typical example, the movement mechanism 150 includes a mechanism for moving at least the fundus camera unit 2 in the x direction (left-right direction), a mechanism for moving it in the y direction (up-down direction), and a mechanism for moving it in the z direction (depth direction, front-back direction). The mechanism for moving in the x direction includes a x stage movable in the x direction and a x movement mechanism for moving the x stage, for example. The mechanism for moving in the y direction includes a y stage movable in the y direction and a y movement mechanism for moving the y stage, for example. The mechanism for moving in the z direction includes a z stage movable in the z direction and a z movement mechanism for moving the z stage, for example. Each movement mechanism includes an actuator such as a pulse motor, and operates under the control of the main controller 211.

The control for the movement mechanism 150 is used for alignment and tracking. Here, tracking is to move the optical system of the apparatus according to the movement of the subject's eye E. To perform tracking, alignment and focus adjustment are performed in advance. The tracking is a function of maintaining a suitable positional relationship in which alignment and focusing are matched by causing the position of the optical system of the apparatus and the like to follow the eye movement. In some embodiments, the movement mechanism 150 is configured to be controlled to change the optical path length of the reference light (that is, the difference of the optical path length between the optical path of the measurement light and the optical path of the reference light).

In the case of manual alignment, a user operates a user interface (UI) 240 described below to relatively move the optical system and subject's eye E so as to cancel the displacement of the subject's eye E with respect to the optical system. For example, the main controller 211 controls the movement mechanism 150 to relatively move the optical system and the subject's eye E by outputting a control signal corresponding to the operation content with respect to the user interface 240 to the movement mechanism 150.

In the case of automatic alignment, the main controller 211 controls the movement mechanism 150 to relatively move the optical system and the subject's eye E so as to cancel the displacement of the subject's eye E with respect to the optical system. In some embodiments, the main controller 211 controls the movement mechanism 150 to relatively move the optical system and the subject's eye E by outputting a control signal to the movement mechanism 150 so that the optical axis of the optical system substantially coincides with the axis of the subject's eye E and the distance of the optical system with respect to the subject's eye E is a predetermined working distance. Here, the working distance is a preset value which is called a working distance of the objective lens 22, and it means the distance between the subject's eye E and the optical system when measuring (imaging) using the optical system.

The main controller 211 controls the fundus camera unit 2 etc. to control the fundus imaging (photography) and the anterior segment imaging. Further, the main controller 211 controls the fundus camera unit 2 and the OCT unit 100 etc. to control the OCT measurement. The main controller 211 is capable of performing a plurality of preliminary operations prior to OCT measurement. Examples of the preliminary operation include alignment, rough focus adjustment, polarization adjustment, and fine focus adjustment. The plurality of preliminary operations is performed in a predetermined order. In some embodiments, the plurality of preliminary operations is performed in an order described above.

It should be noted that the types and the orders of the preliminary operations are not so limited, and they may be optional. For example, the preliminary operations may further include microcoria judgment. The microcoria judgment is a preliminary operation to judge whether the pupil of the subject's eye E is small or not (whether the subject's eye E is microcoria or not). The microcoria judgment may be performed between the rough focus adjustment and the optical path length difference adjustment. In some embodiments, the microcoria judgment includes, for example, a series of processes as follows: acquiring a front image (anterior segment image) of the subject's eye E; specifying an image region corresponding to the pupil; calculating the size (e.g., diameter, circumference length) of the pupil region; judging whether the pupil of the subject's eye E is small or not based on the calculated size (threshold processing); and controlling the diaphragm 19 when judged that the pupil of the subject's eye E is small. In some embodiments, the micorcoria judgment further includes processing to approximate the pupil region as a circle or an ellipse in order to obtain the size of the pupil region.

The rough focus adjustment is a kind of focus adjustment using the split indicator. The rough focus adjustment may be performed by determining the position of the photography focusing lens 31 based on information, which is obtained by associating the eye refractive power acquired in advance with the position of the photography focusing lens 31, and a measured value of the refractive power of the subject's eye E.

The fine focus adjustment is performed on the basis of interference sensitivity of OCT measurement. For example, the fine focus adjustment can be performed by: monitoring interference intensity (interference sensitivity) of interference signal acquired by performing OCT measurement of the subject's eye E; searching the position of the OCT focusing lens 43 so as to maximize the interference intensity; and moving the OCT focusing lens 43 to the searched position.

To perform the optical path length difference adjustment, the optical system is controlled so that a predetermined position on the subject's eye E is a reference position of a measurement range in the depth direction. The control is performed on at least one of the optical path length changing units 41 and 114. Thereby, the difference of the optical path length between the measurement optical path and the reference optical path is adjusted. By setting the reference position in the optical path length difference adjustment, OCT measurement can be performed with high accuracy over a desired measurement range in the depth direction simply by changing the wavelength sweep speed.

To perform the polarization adjustment, the polarization state of the reference light LR is adjusted for optimizing the interference efficiency between the measurement light LS and the reference light LR.

(Storage Unit)

The storage unit 212 stores various types of data. Examples of the data stored in the storage unit 212 include image data of the OCT image, image data of the fundus image, image data of the anterior segment image, and subject's eye information. The subject's eye information includes information on the subject such as patient ID and name, and information on the subject's eye such as identification information of the left eye/right eye.

In addition, the storage unit 212 stores various kinds of computer programs and data for operating the ophthalmic apparatus 1.

The controller 210 can control an image forming unit 230 and a data processor 300.

(Image Forming Unit)

The image forming unit 230 forms an OCT image (image data) of the subject's eye E based on the sampling data obtained by sampling the detection signal from the detector 125 using the DAQ 130. Examples of the OCT image formed by the image forming unit 230 include an A-scan image. The image forming unit 230 may form a B-scan image (tomographic image) and a C-scan image. As with the conventional swept source OCT, the image formation process includes noise removal (noise reduction), filtering, dispersion compensation, fast Fourier transform (FFT), and the like. In the case of employing an OCT apparatus of another type, the image forming unit 230 performs known processing according to the type employed.

The image forming unit 230 includes, for example, the circuitry described above. It should be noted that "image data" and an "image" based on the image data may not be distinguished from each other in the present specification.

(Data Processor)

The data processor 300 processes data acquired through imaging of the subject's eye E or data acquired through OCT measurement. For example, the data processor 300 performs various kinds of image processing and various kinds of analysis processing on the image formed by the image forming unit 230. Specifically, the data processor 300 performs various types of image correction processing such as brightness correction. Further, the data processor 300 can perform various kinds of image processing and various kinds of analysis processing on images captured by the fundus camera unit 2 (e.g., fundus image, anterior segment image, etc.).

The data processor 300 performs known image processing such as interpolation for interpolating pixels in tomographic images to form image data of the three-dimensional image of the fundus Ef or the anterior segment Ea. It should be noted that the image data of the three-dimensional image means image data in which the positions of pixels are defined in a three-dimensional coordinate system. Examples of the image data of the three-dimensional image include image data defined by voxels three-dimensionally arranged. Such image data is referred to as volume data or voxel data.

When displaying an image based on volume data, the data processor 300 performs rendering (volume rendering, maximum intensity projection (MIP), etc.) on the volume data, thereby forming image data of a pseudo three-dimensional image viewed from a particular line of sight. The pseudo three-dimensional image is displayed on the display device such as a display unit 240A.

The three-dimensional image data may be stack data of a plurality of tomographic images. The stack data is image data formed by three-dimensionally arranging tomographic images along a plurality of scan lines based on positional relationship of the scan lines. That is, the stack data is image data obtained by representing tomographic images, which are originally defined in their respective two-dimensional coordinate systems, by a single three-dimensional coordinate system. That is, the stack data is image data formed by embedding tomographic images into a single three-dimensional space.

The data processor 300 can form a B-mode image (longitudinal cross-sectional image, axial cross-sectional image) in an arbitrary cross section, a C-mode image (transverse section image, horizontal cross-sectional image) in an arbitrary cross section, a projection image, a shadowgram, etc., by performing various renderings on the acquired three-dimensional data set (volume data, stack data, etc.). An image in an arbitrary cross section such as a B-mode image or a C-mode image is formed by selecting pixels (voxels) on a designated cross section from the three-dimensional data set. The projection image is formed by projecting the three-dimensional data set in a predetermined direction (z direction, depth direction, axial direction). The shadowgram is formed by projecting a part of the three-dimensional data set in a predetermined direction. Examples of the part of the three-dimensional data set include partial data corresponding to a specific layer. An image having a viewpoint on the front side of the subject's eye, such as the C-mode image, the projection image, and the shadowgram, is called a front image (en-face image).

The data processor 300 can build (form) the B-mode image or the front image (blood vessel emphasized image, angiogram) in which retinal blood vessels and choroidal blood vessels are emphasized (highlighted), based on data (for example, B-scan image data) acquired in time series by OCT. For example, the OCT data in time series can be acquired by repeatedly scanning substantially the same site of the subject's eye E.

In some embodiments, the data processor 300 compares the B-scan images in time series acquired by B-scan for substantially the same site, converts the pixel value of a change portion of the signal intensity into a pixel value corresponding to the change portion, and builds the emphasized image in which the change portion is emphasized. Further, the data processor 300 forms an OCTA image by extracting information of a predetermined thickness at a desired site from a plurality of built emphasized images and building as an en-face image.

An image (for example, a three-dimensional image, a B-mode image, a C-mode image, a projection image, a shadowgram, and an OCTA image) generated by the data processor 300 is also included in the OCT image.

Further, the data processor 300 determines the focus state of the measurement light LS in fine focus adjustment control by analyzing the detection result of the interference light obtained by the OCT measurement. For example, the main controller 211 performs repetitive OCT measurements while controlling the focusing driver 43A according to a predetermined algorithm. The data processor 300 analyzes detection results of interference light LC repeatedly acquired by the OCT measurements to calculate predetermined evaluation values relating to image quality of OCT images. The data processor 300 determines whether the calculated evaluation value is equal to or less than a threshold. In some embodiments, the fine focus adjustment is continued until the calculated evaluation value becomes equal to or less than the threshold. That is, when the evaluation value is equal to or less than the threshold, it is determined that the focus state of the measurement light LS is appropriate. And the fine focus adjustment is continued until it is determined that the focus state of the measurement light LS is appropriate.

In some embodiments, the main controller 211 monitors the intensity of the interference signal (interference intensity, interference sensitivity) acquired sequentially while acquiring the interference signal by performing the repetitive OCT measurements as described above. In addition, while performing this monitoring process, the OCT focusing lens 43 is moved to find the position of the OCT focusing lens 43 in which the interference intensity is maximized. With the fine focus adjustment thus performed, the OCT focusing lens 43 can be guided to the position where the interference intensity is optimized.

Further, the data processor 300 determines the polarization state of at least one of the measurement light LS and the reference light LR by analyzing the detection result of the interference light obtained by the OCT measurement. For example, the main controller 211 performs repetitive OCT measurements while controlling at least one of the polarization controllers 103 and 118 according to a predetermined algorithm. In some embodiments, the main controller 211 controls the attenuator 120 to change an attenuation of the reference light LR. The data processor 300 analyzes detection results of interference light LC repeatedly acquired by the OCT measurements to calculate predetermined evaluation values relating to image quality of OCT images. The data processor 300 determines whether the calculated evaluation value is equal to or less than a threshold. The threshold is set in advance. Polarization adjustment is continued until the calculated evaluation value becomes equal to or less than the threshold. That is, when the evaluation value is equal to or less than the threshold, it is determined that the polarization state of the measurement light LS is appropriate. And the polarization adjustment is continued until it is determined that the polarization state of the measurement light LS is appropriate.

In some embodiments, the main controller 211 can monitor the interference intensity also in the polarization adjustment.

Figure 5:
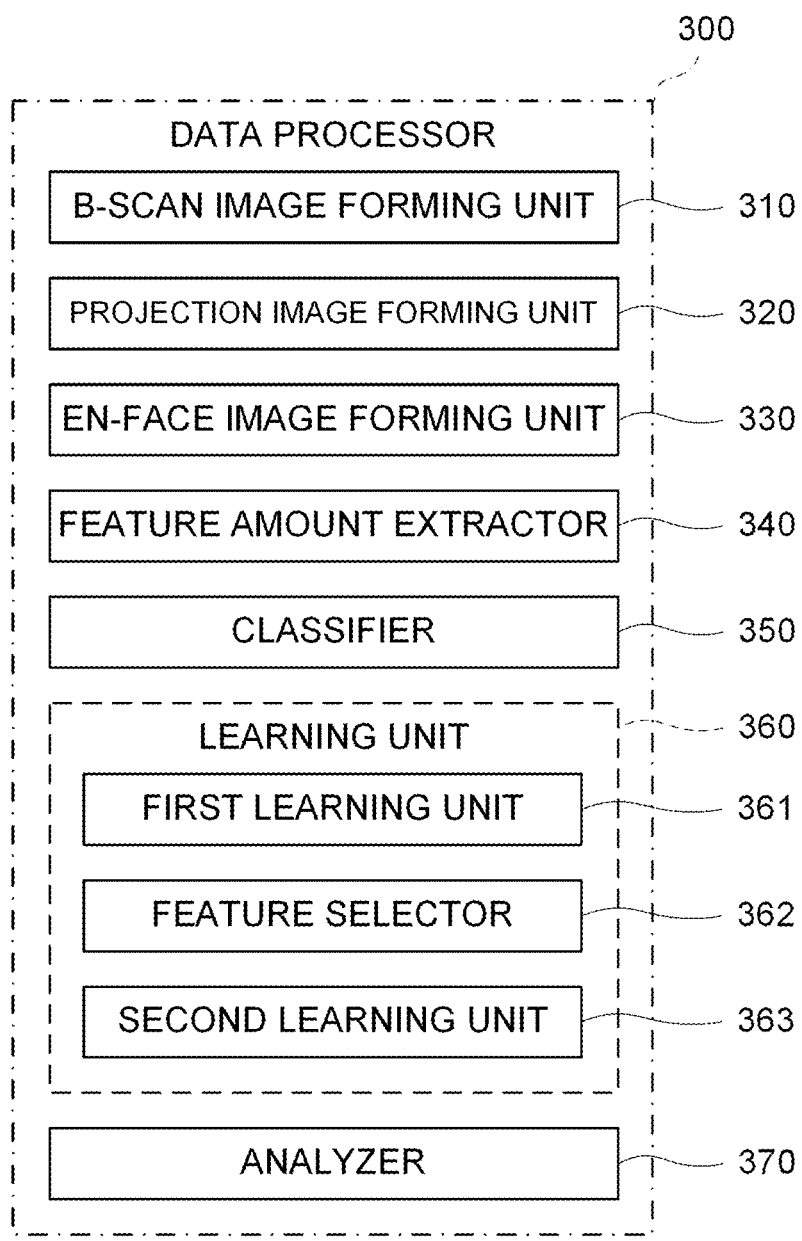
FIG. 5 is a schematic diagram illustrating an example of a configuration of a processing system of the ophthalmic apparatus according to the embodiments.
Figure 6:
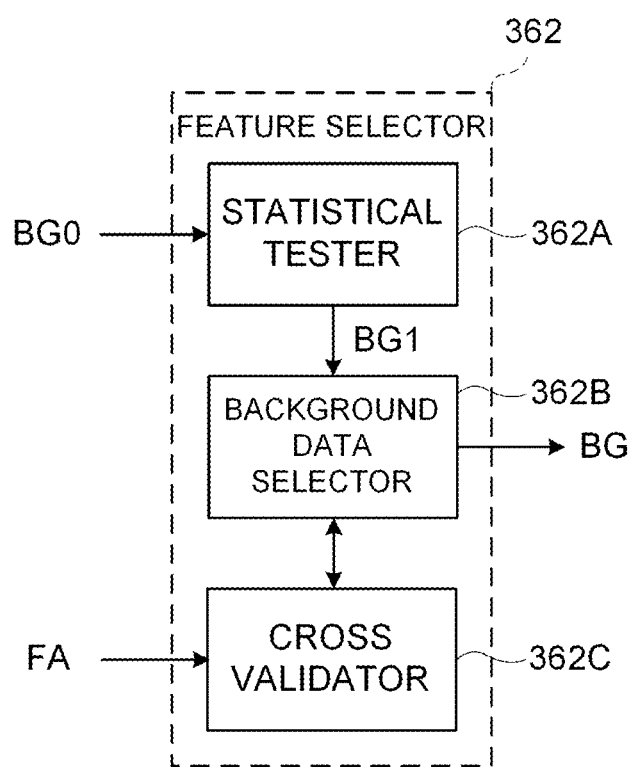
FIG. 6 is a schematic diagram illustrating an example of a configuration of a processing system of the ophthalmic apparatus according to the embodiments.
Figure 7A:
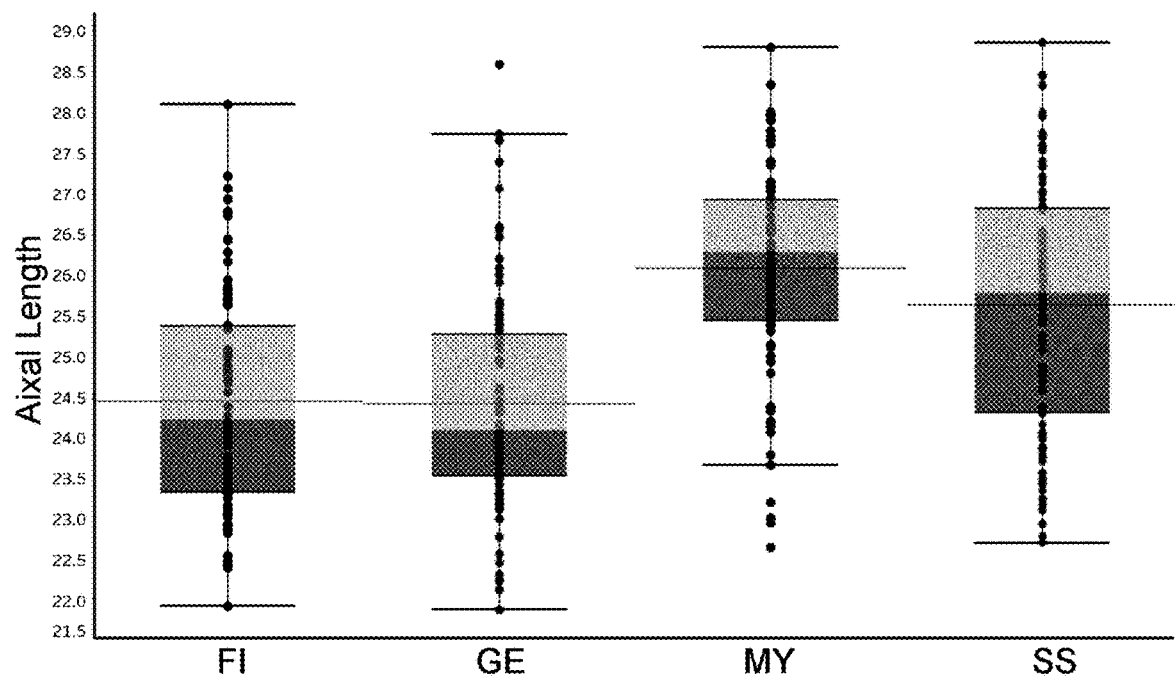
FIG. 7A is a schematic diagram for explaining an operation of the ophthalmic apparatus according to the embodiments.
Figure 7B:
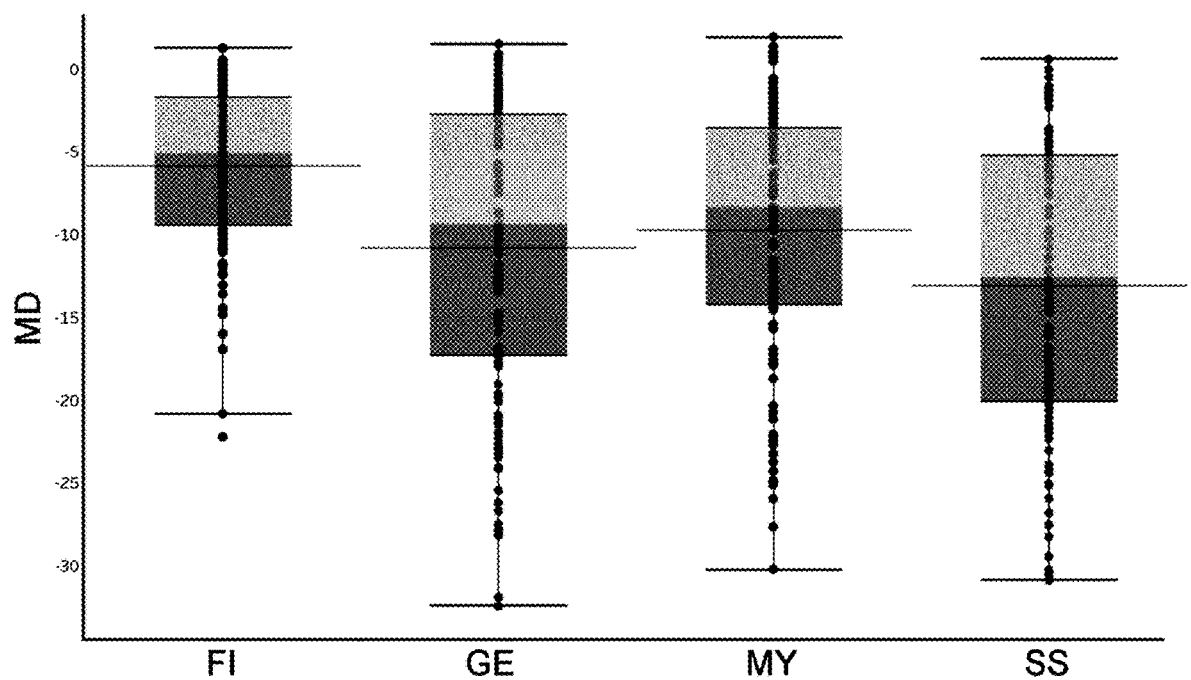
FIG. 7B is a schematic diagram for explaining an operation of the ophthalmic apparatus according to the embodiments.
Figure 7C:
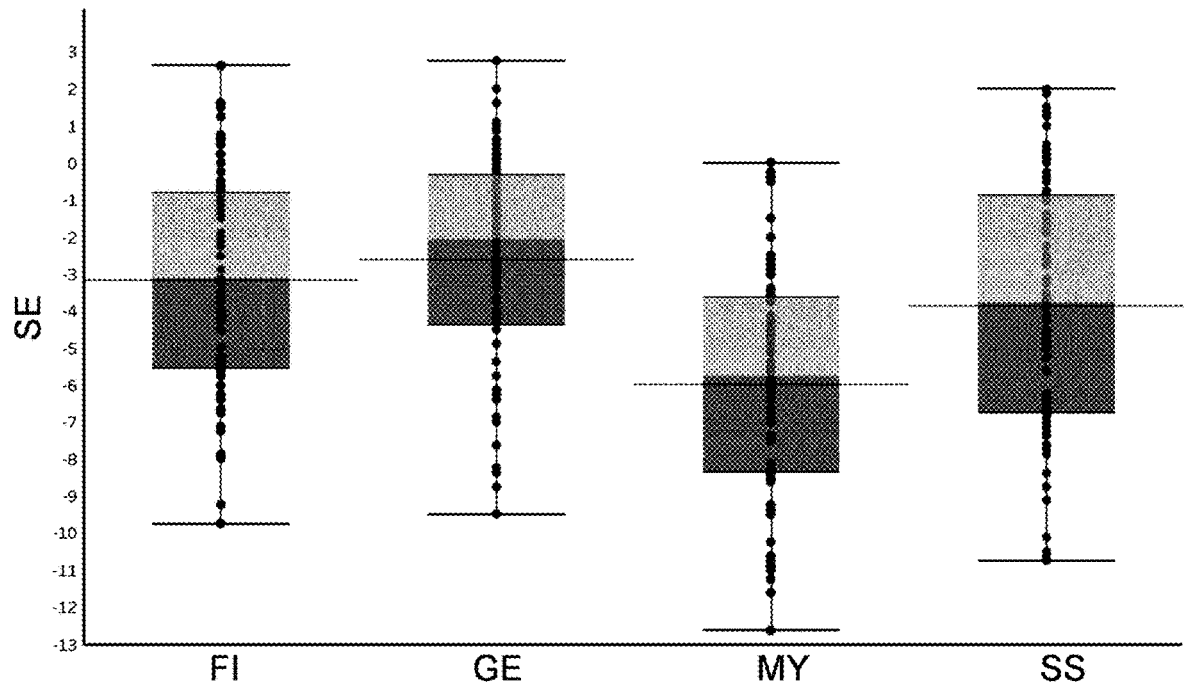
FIG. 7C is a schematic diagram for explaining an operation of the ophthalmic apparatus according to the embodiments.
Figure 7D:
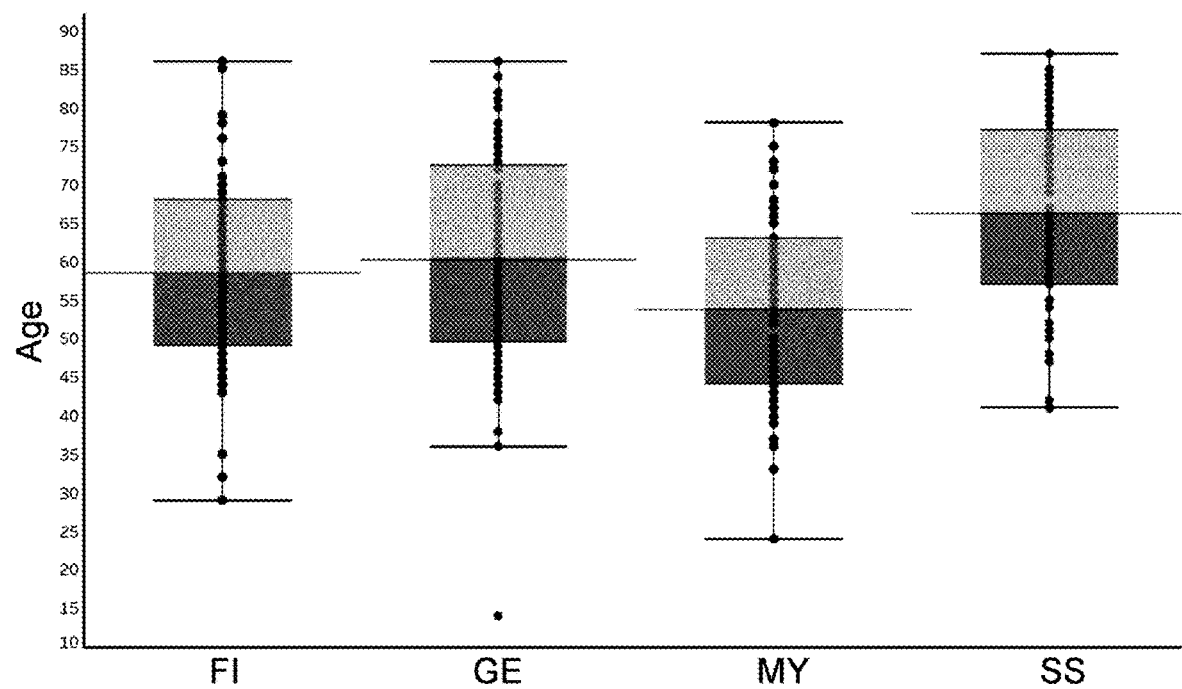
FIG. 7D is a schematic diagram for explaining an operation of the ophthalmic apparatus according to the embodiments.
Figure 7E:
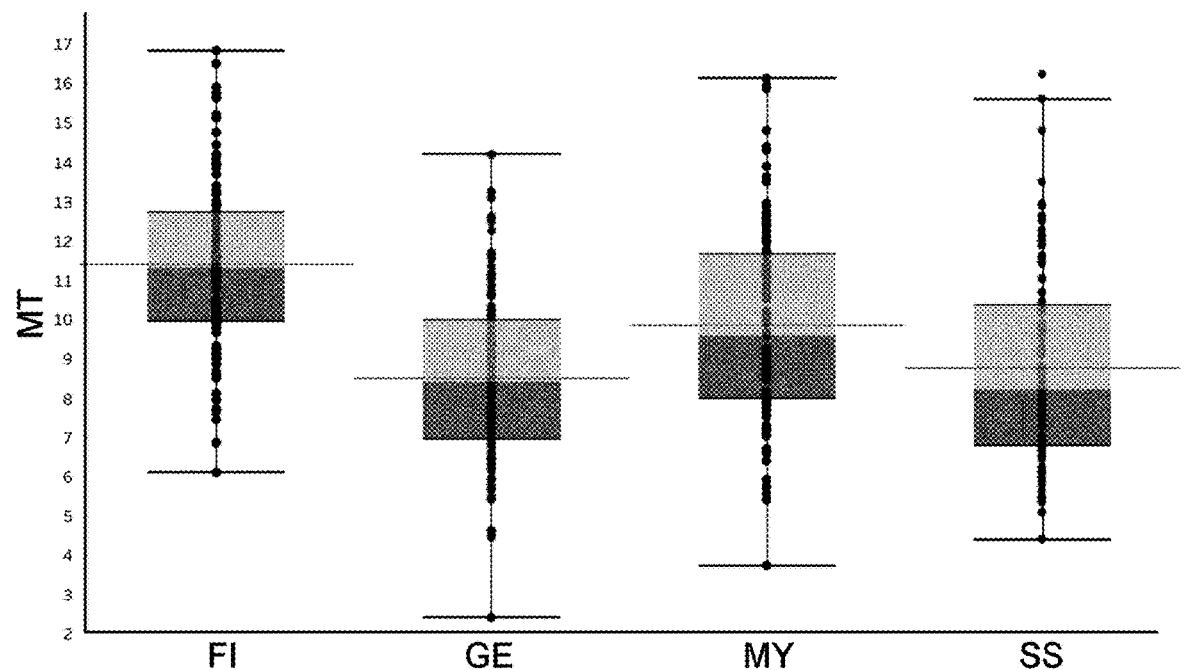
FIG. 7E is a schematic diagram for explaining an operation of the ophthalmic apparatus according to the embodiments.
Figure 7F:
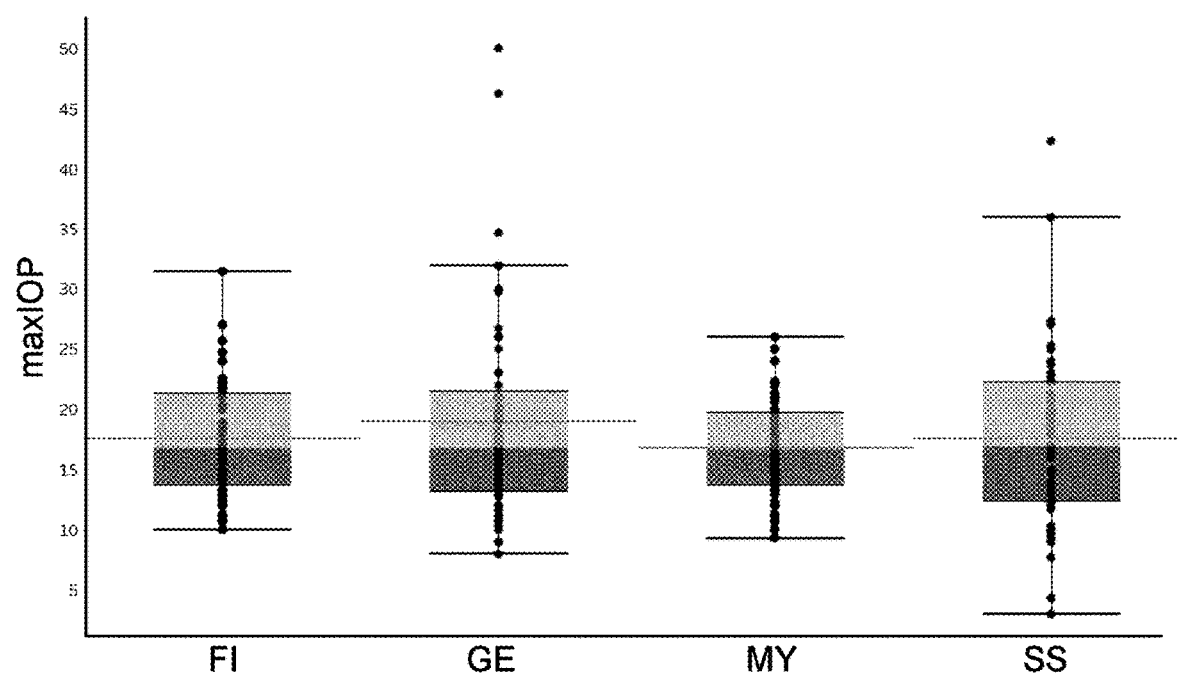
FIG. 7F is a schematic diagram for explaining an operation of the ophthalmic apparatus according to the embodiments.
Figure 7G:
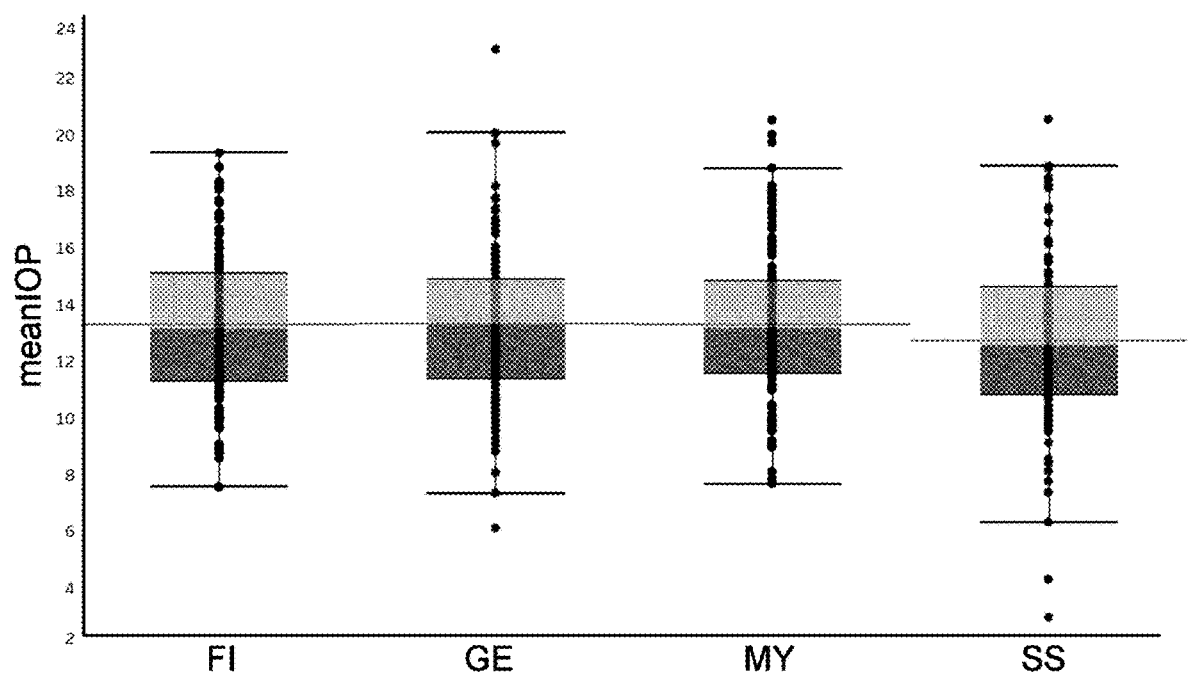
FIG. 7G is a schematic diagram for explaining an operation of the ophthalmic apparatus according to the embodiments.
Figure 7H:
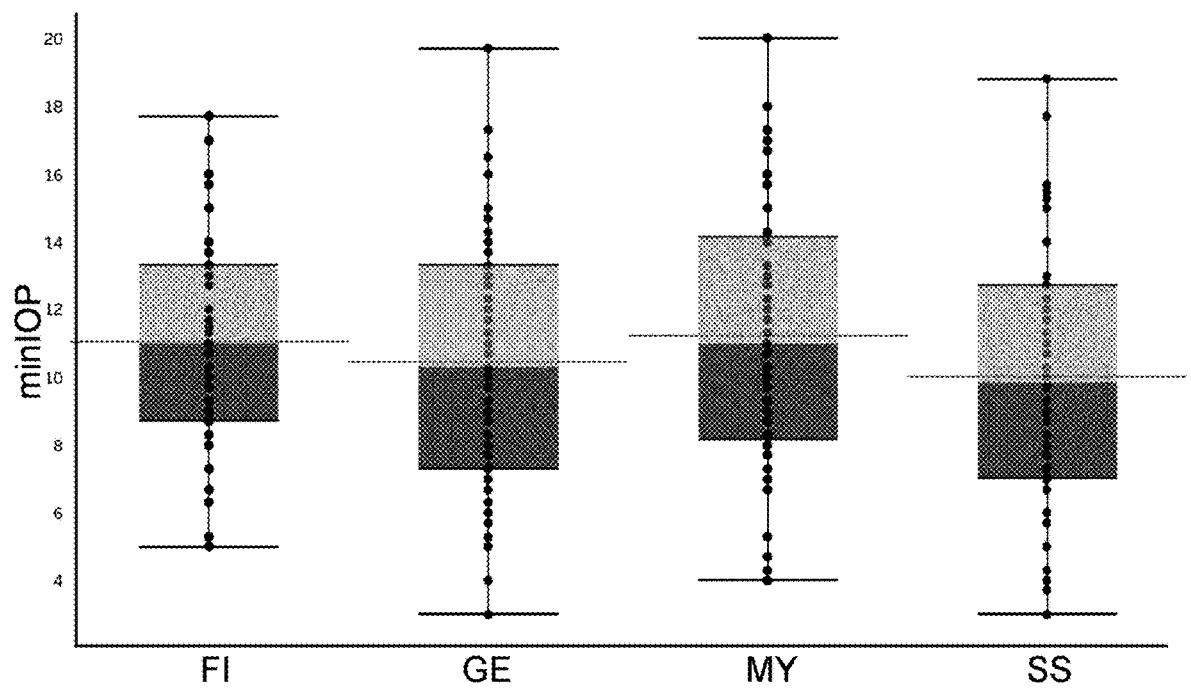
FIG. 7H is a schematic diagram for explaining an operation of the ophthalmic apparatus according to the embodiments.
Figure 8:
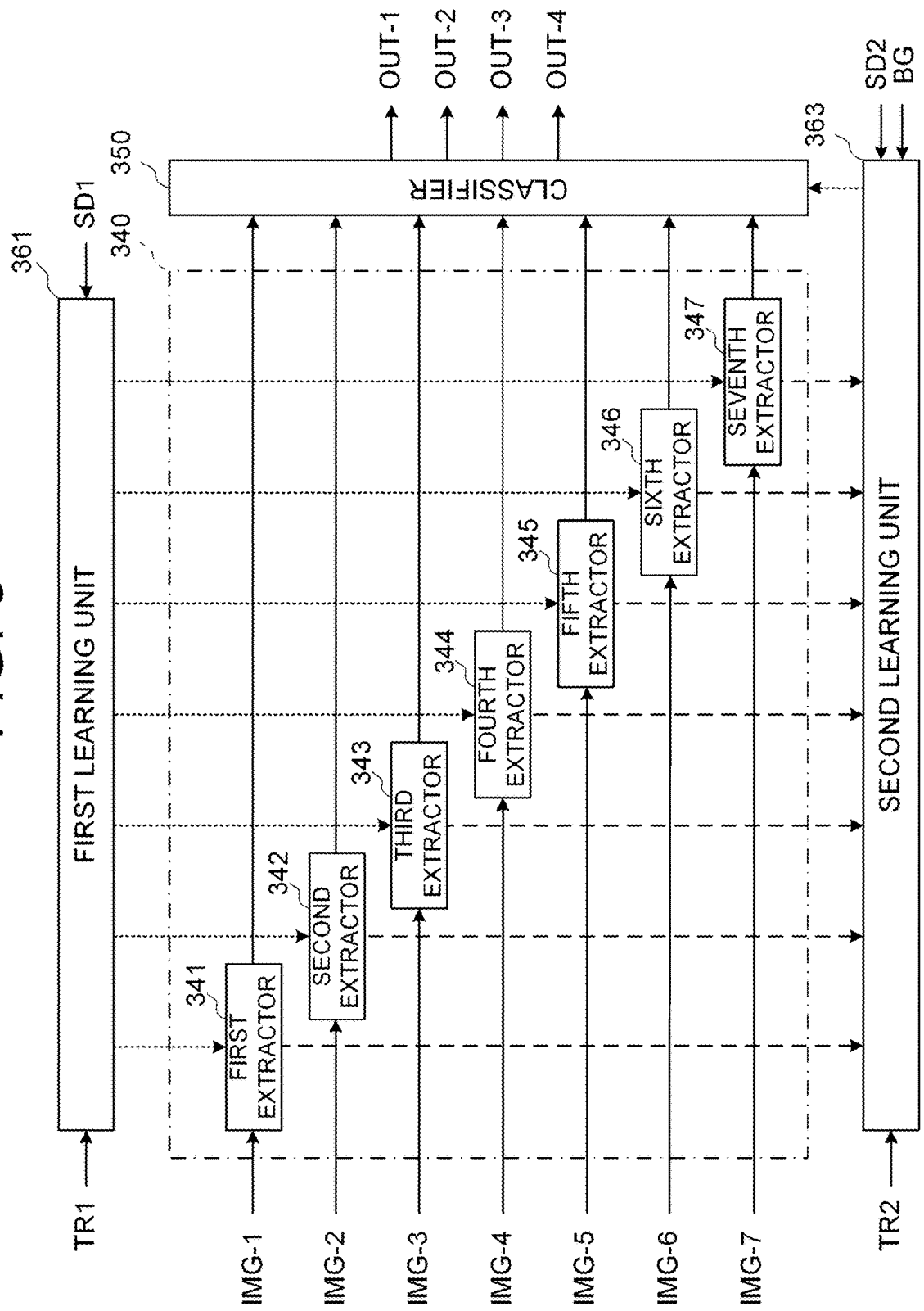
FIG. 8 is a schematic diagram illustrating an example of a configuration of the processing system of the ophthalmic apparatus according to the embodiments.
Figure 9:
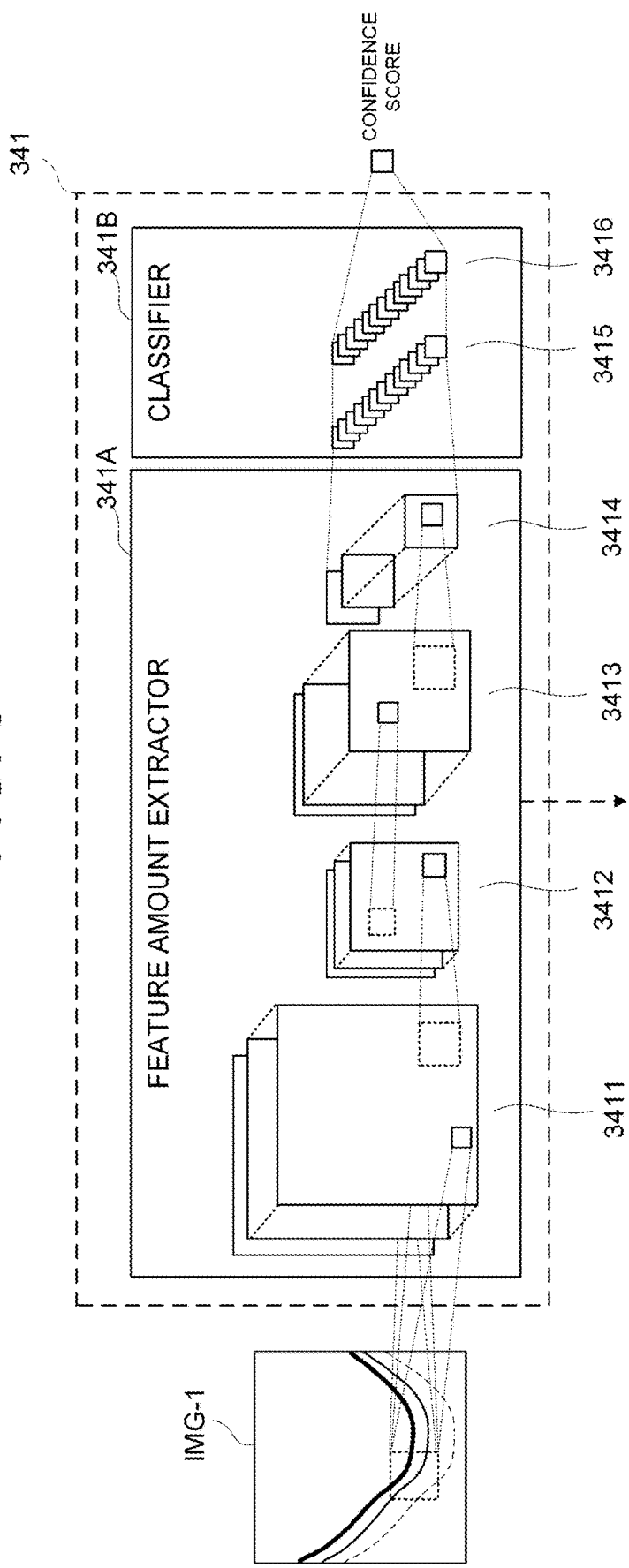
FIG. 9 is a schematic diagram illustrating an example of a configuration of the processing system of the ophthalmic apparatus according to the embodiments.

FIGS. 5 to 9H show diagrams for explaining the data processor 300 according to the embodiments. FIG. 5 represents a block diagram of an example of the configuration of the data processor 300 according to the embodiments. FIG. 6 represents a block diagram of an example of the configuration of a feature selector 362 in FIG. 5. FIGS. 7A to 7H represent diagrams describing the operation of a statistical tester 362A in FIG. 6. FIG. 8 represents a schematic diagram of the relationship between a feature amount extractor 340, a classifier 350, and a learning unit 360 in FIG. 5. FIG. 9 is a schematic diagram illustrating an example of a configuration of a first extractor 341 in FIG. 8.

The data processor 300 includes a B-scan image forming unit 310, a projection image forming unit 320, an en-face image forming unit 330, the feature amount extractor 340, the classifier 350, the learning unit 360, and an analyzer 370.

The B-scan image forming unit 310 forms the B-scan image in a desired cross-sectional orientation passing through a desired site, by arranging A-scan images formed by the image forming unit 230. Alternatively, the B-scan image forming unit 310 forms the B-scan image in the desired cross-sectional orientation passing through the desired site, by selecting pixels on a desired cross-sectional surface from the image data of the three-dimensional image (three-dimensional OCT data) obtained as described above. The B-scan image forming unit 310, for example, forms the B-scan image in the desired orientation passing through a site identified by the analyzer 370 described below. The B-scan image described above may be formed by the image forming unit 230.

The B-scan image forming unit 310 can form the B-scan image IMG-1 in the horizontal direction passing through the center of the optic disc, the B-scan image IMG-2 in the vertical direction passing through the center of the optic disc, the B-scan image IMG-3 in the vertical direction passing through the center of the fovea, the B-scan image IMG-6 in the vertical direction passing through midway between the center of the optic disc and the center of the fovea, from the three-dimensional image data of the subject's eye E by performing processing described above.

The projection image forming unit 320 forms the projection image of the fundus Ef of the subject's eye E. For example, the projection image forming unit 320 forms the projection image IMG-4 of the fundus Ef by projecting the three-dimensional image data of the fundus Ef in the z direction.

The en-face image forming unit 330 forms the en-face image IMG-5 of the fundus Ef of the subject's eye E. For example, the en-face image forming unit 330 analyzes the three-dimensional image data of the fundus Ef to identify an uppermost layer (e.g., inner limiting membrane) of the retina, and forms the en-face image by integrating pixels for a predetermined depth (e.g., 50 micrometers) in the depth direction (z direction) from the identified uppermost layer. In other words, the en-face image forming unit 330 forms an integrated image formed by projecting a layer region in a deep layer from a layer region corresponding to the inner limiting membrane, as the en-face image IMG-5.

The feature amount extractor 340 extracts feature amounts of each of the B-scan images IMG-1 to IMG-3 and IMG-6 formed by the B-scan image forming unit 310, the projection image IMG-4 formed by the projection image forming unit 320, the en-face image IMG-5 formed by the en-face image forming unit 330, and the color fundus image IMG-7 acquired using the imaging optical system 30. The feature amount extractor 340 according to the embodiments extracts the confidence score information as the feature amount(s), similar to the confidence score information OUT-1 to OUT-4 output by the classifier 350 described below. Here, the extracted confidence score information represents the confidence score of each of the four types of the pathological condition of glaucoma according to Nicolela's classification for each of the images IMG-1 to IMG-7.

The feature amount extractor 340 extracts the feature amounts of each of the images IMG-1 to IMG-7 of the subject's eye E, using the individual estimation models obtained by performing machine learning in advance corresponding to each of the images IMG-1 to IMG-7. The feature amount extractor 340 includes a plurality of extractors (first extractor 341 to seventh extractor 347, see FIG. 8) corresponding to the images IMG-1 to IMG-7.

The individual estimation model (learned model) according to the embodiments is used in a computer (processor) including a CPU and a memory. The function of the feature amount extractor 340 is realized by a Convolutional Neural Network (Hereinafter, CNN), for example. In other words, in accordance with the commands from the learned model stored in the memory, the CPU operates so as to perform the calculation based on the learned weighting coefficients and response functions in the CNN on the pixel values of the image that is input to a convolution layer, and to output the confidence score information (feature amount in the broad sense of the term) from an output layer or the feature amount from an intermediate layer. The feature amount extractor 340 having such a configuration can extract a local correlation pattern while gradually reducing the resolution of the input image, and output the feature amount based on the extracted correlation pattern.

The feature amount extractor 340 realizes the functions of the feature amount extractor 1100 shown in FIG. 1A and FIG. 1B.

The classifier 350 outputs the confidence score information OUT-1 to OUT-4 described above, based on the feature amounts of each of the images IMG-1 to IMG-7 extracted by the feature amount extractor 340 and the background data BG. The classifier 350 outputs the confidence score information OUT-1 to OUT-4 corresponding to feature amounts of each of the images IMG-1 to IMG-7 extracted by the feature amount extractor 340 and the background data BG, using a classification model obtained by performing machine learning in advance.

The classification model according to the embodiments is used in the computer (processor) including a CPU and a memory. The functions of the classifier 350 is, for example, realized by a support vector machine (SVM).

The classifier 350 realizes the functions of the classifier 1200 shown in FIG. 1A and FIG. 1B.

The learning unit 360 performs machine learning to generate the individual estimation model(s) (learned model(s)) in the feature amount extractor 340 and the classification model (learned model) in the classifier 350. The learning unit 360 includes a first learning unit 361, a feature selector 362, and a second learning unit 363.

The first learning unit 361 generates the individual estimation models corresponding to each of the image by performing supervised machine learning for each of types of the images IMG-1 to IMG-7. Here, in the supervised machine learning, the images for training are used as training data, and the classification results of the pathological condition of glaucoma classified by doctor(s) or other person(s) according to Nicolela's classification for each image are used as teaching data.

The feature selector 362 selects the background data that contributes to the improvement of classification accuracy based on the respective distributions of a plurality of background data. Specifically, the feature selector 362 performs statistical test on the two or more background data BG0 of each of a plurality of subjects with glaucoma (disease) to select the background data BG that contributes to the improvement of classification accuracy of the pathological conditions.

The feature selector 362 includes a statistical tester 362A, a background data selector 362B, and a cross validator 362C, as shown in FIG. 6.

The statistical tester 362A performs statistical test on each of the two or more background data BG0. The background data BG0 includes, for example, the age of the subject, the gender of the subject, the axial length of the subject's eye, the MD value of the subject's eye, the equivalent spherical power of the subject's eye, the MT value of the subject's eye, the minimum intraocular pressure value over the past year, the maximum intraocular pressure value over the past year, and the average intraocular pressure value over the past year. Specifically, the statistical tester 362A obtains the distribution of each of the four types of the pathological condition of glaucoma according to Nicolela's classification for each background data, and identifies the background data BG1 that is judged to have high probability of improving the classification accuracy of the type. For example, the statistical tester 362A analyzes the difference in average values between background data by performing one-way analysis of variance (one-way ANOVA) on each of the background data BG0, and identifies the background data BG1 with a p-value less than a predetermined threshold value (e.g., 0.01).

FIG. 7A shows an example of the distribution of the axial lengths of eyes of a plurality of subjects with glaucoma in four types (FI type, GE type, MY type, SS type) of the pathological condition of glaucoma according to Nicolela's classification. In FIG. 7A, a box plots showing a first quartile, a second quartile, and a third quartile are shown for each type.

Focusing on the second quartile, differences exist in the average values of the distribution of the axial lengths in each type. In case of FIG. 7A, the amount of statistics is 27.95 and the p-value is less than 0.001. The statistical tester 362A identifies the axial lengths, in which the p-value is less than 0.01, as the background data BG1.

FIG. 7B shows an example of the distribution of the MD values of eyes of a plurality of subjects with glaucoma in four types of the pathological condition of glaucoma according to Nicolela's classification. In FIG. 7B, a box plots showing a first quartile, a second quartile, and a third quartile are shown for each type, as in FIG. 7A.

In case of FIG. 7B, the amount of statistics is 16.23 and the p-value is less than 0.001. The statistical tester 362A identifies the MD values of the subjects, in which the p-value is less than 0.01, as the background data BG1.

FIG. 7C shows an example of the distribution of the equivalent spherical powers of eyes of a plurality of subjects with glaucoma in four types of the pathological condition of glaucoma according to Nicolela's classification. In case of FIG. 7C, the amount of statistics is 19.90 and the p-value is less than 0.001. The statistical tester 362A identifies the equivalent spherical powers of the subjects, in which the p-value is less than 0.01, as the background data BG1.

FIG. 7D shows an example of the distribution of the ages of a plurality of subjects with glaucoma in four types of the pathological condition of glaucoma according to Nicolela's classification. In case of FIG. 7D, the amount of statistics is 24.36 and the p-value is less than 0.001. The statistical tester 362A identifies the ages of the subjects, in which the p-value is less than 0.01, as the background data BG1.

FIG. 7E shows an example of the distribution of the MT values of eyes of a plurality of subjects with glaucoma in four types of the pathological condition of glaucoma according to Nicolela's classification. In case of FIG. 7E, the amount of statistics is 34.56 and the p-value is less than 0.001. The statistical tester 362A identifies the MT values of the subjects, in which the p-value is less than 0.01, as the background data BG1.

FIG. 7F shows an example of the distribution of the maximum intraocular pressure values over the past year of eyes of a plurality of subjects with glaucoma in four types of the pathological condition of glaucoma according to Nicolela's classification. In case of FIG. 7F, the amount of statistics is 1.35 and the p-value is 0.259. The statistical tester 362A excludes the maximum intraocular pressure values over the past year of the eyes of the subjects, in which the p-value is not less than 0.01, from the background data BG1.

FIG. 7G shows an example of the distribution of the average intraocular pressure values over the past year of eyes of a plurality of subjects with glaucoma in four types of the pathological condition of glaucoma according to Nicolela's classification. In case of FIG. 7G, the amount of statistics is 1.44 and the p-value is 0.23081. The statistical tester 362A excludes the average intraocular pressure values over the past year of the eyes of the subjects, in which the p-value is not less than 0.01, from the background data BG1.

FIG. 7H shows an example of the distribution of the minimum intraocular pressure values over the past year of eyes of a plurality of subjects with glaucoma in four types of the pathological condition of glaucoma according to Nicolela's classification. In case of FIG. 7H, the amount of statistics is 5.89 and the p-value is 0.000596. The statistical tester 362A identifies the minimum intraocular pressure value over the past, in which the p-value is less than 0.01, as the background data BG1.

As described above, the statistical tester 362A identifies the background data BG1, in which the maximum intraocular pressure values over the past year of the subject's eye and the average intraocular pressure values over the past year of the subject's eye are excluded from the background data BG0.

The background data selector 362B selects the background data BG among the combinations of the two or more background data BG1 identified by the statistical tester 362A. Specifically, the background data selector 362B selects one of the combinations of the one or more background data among the two or more background data BG1 identified by the statistical tester 362A, and obtains the accuracy obtained by performing cross validation performed by the cross validator 362C using the selected combination of the one or more background data. The background data selector 362B sequentially repeats the selection of the one or more background data and the acquisition of the accuracy from the cross validator 362C, and performs feature selection by selecting the combination of the one or more background data with the highest accuracy as the background data BG.

The cross validator 362C performs cross validation using the combination of the one or more background data selected by the background data selector 362B and the respective feature amounts FA of the images IMG-1 to IMG-7 extracted by the feature amount extractor 340, and calculates the accuracy. For example, k-fold cross validation is performed as the cross validation (e.g., k=5). In this case, the cross validator 362C outputs the average value of the k accuracies obtained by dividing by k as the accuracy of the cross validation result using the combination(s) of the one or more background data selected by the background data selector 362B.

In some embodiments, the feature selector 362 performs the feature selection described above using a linear model (e.g., SVM) as the classifier, the linear model being penalized by L1 norm for the feature amounts FA of each of the images IMG-1 to IMG-7 extracted by the feature amount extractor 340.

For example, when the feature amount(s) extracted by the feature amount extractor 340 are the confidence score information OUT-1 to OUT-4 of each of the images IMG-1 to IMG-7 and the background data BG1 identified by the statistical tester 362A is the six types of background data described above, the feature selector 362 performs the feature selection processing on the combinations of data in 34 (=7×4+6) dimensions.

The second learning unit 363 generates the classification model by performing supervised machine learning. Here, in the supervised machine learning, the feature amounts of the images IMG-1 to IMG-7 for training are used as training data, and the classification results of the pathological condition of glaucoma classified by doctor(s) or other person(s) according to Nicolela's classification are used as teaching data.

The analyzer 370 performs predetermined analysis processing on the image data of the image formed by the image forming unit 230 or the data processor 300. Examples of the analysis processing include identification processing of a predetermined site, identification processing of a predetermined layer region, and a generation processing of a tomographic image in a desired cross-sectional orientation at a desired cross-sectional position.

Examples of the predetermined site include a center of the optic disc, a fovea, a position of midway between the optic disc and the fovea.

For example, the techniques disclosed in Japanese Unexamined Patent Application Publication No. 2008-206684 can be applied to the identification processing of the center (or center of gravity) of the optic disc. A typical identification of the center of the optic disc includes processing of identifying an optic disc image (e.g., image region corresponding to the edge of the optic disc) from the three-dimensional OCT data or the fundus image, processing of obtaining a circle (or ellipse) that approximates the edge of the optic disc, and processing of obtaining the center of the obtained approximate circle (or approximate ellipse).

The processing of identifying the center (or center of gravity) of the fovea can be performed in the same way as the processing of identifying the center of the optic disc.

The analyzer 370 can also identify a blood vessel, a site of lesion, or the like as the predetermined site. Examples of the site of lesion include a detachment part, a hydrops, a hemorrhage, a tumor, and a drusen.

Examples of the predetermined layer region include the inner limiting membrane, the nerve fiber layer, the ganglion cell layer, the inner plexiform layer, the inner nuclear layer, the outer plexiform layer, the outer nuclear layer, the external limiting membrane, the photoreceptor layer, the Retinal Pigment Epithelium (RPE), the Bruch membrane, the choroid, the sclera, the vitreous body, or the like.

Examples of the processing of identifying the predetermined layer region include known segmentation processing. The analyzer 370 analyzes the three-dimensional OCT data to identify a plurality of layer regions in the A-scan direction. The segmentation processing is image processing for identifying specific tissues and/or tissue boundaries. For example, the analyzer 370 obtains the gradients of the pixel values (i.e., brightness values) in each A-scan image included in the OCT data, and identifies a position where the gradient value is large as a tissue boundary. The analyzer 370 specifies, for example, a layer tissue for a predetermined number of pixels on the sclera side with respect to the specified RPE as the Bruch membrane. It should be noted that the A-scan image is one-dimensional image data extending in the depth direction of the fundus. It should be noted that the depth direction of the fundus is defined as, for example, the z direction, the incident direction of the OCT measurement light, the axial direction, the optical axis direction of the interference optical system, or the like.

The processing of generating the tomographic image in the desired cross-sectional orientation at the desired cross-sectional position is realized, for example, by identifying a cross-sectional position with reference to a predetermined site or layer region identified by the identification processing described above in the three-dimensional OCT data and selecting or interpolating pixels in the desired cross-sectional orientation at the identified cross-sectional position. It should be noted that a tomographic image in the desired cross-sectional orientation at a cross-sectional position designated by the user using operation unit 240B may be generated in this processing of generating the tomographic image.

Further, the analyzer 370 can perform predetermined processing on the three-dimensional OCT data, the OCT image, or the fundus image. Examples of the predetermined analysis processing include, in addition to identifying of a predetermined site (tissue, site of lesion) of the subject's eye E, calculating a distance between designated sites (distance between layers, interlayer distance), area, angle, ratio, or density; calculating by a designated formula; identifying the shape of a predetermined site; calculating these statistics; calculating distribution of the measured value or the statistics; image processing based on these analysis processing results, and the like.

The data processor 300 that functions described above includes, for example, a processor described above, a RAM, a ROM, a hard disk drive, a circuit board, and the like. In a storage device such as the hard disk drive, a computer program for causing the processor to execute the functions described above is stored in advance.

FIG. 8 shows a schematic diagram for explaining the operation of the data processor 300 in FIG. 5. FIG. 8 schematically represents the relationship between the feature amount extractor 340, the classifier 350, and the learning unit 360. In FIG. 8, the feature amount extractor 340, the classifier 350, the first learning unit 361, and the second learning unit 363 are illustrated. In FIG. 8, like reference numerals designate like parts as in FIG. 5, and the same description may not be repeated.

The first learning unit 361 generates individual estimation models for estimating whether or not the subject's eye is in one of the four types of the pathological condition of glaucoma for each of the images IMG-1 to IMG-6 generated from the three-dimensional OCT data and the color fundus image IMG-7. The first learning unit 361 generates the individual estimation models by performing supervised machine learning for each of the plurality of images. In some embodiments, the first learning unit 361 generates a plurality of individual estimation models by performing transfer learning.

For example, for the B-scan image IMG-1 in the horizontal direction passing through the center (or near) of the optic disc, the first learning unit 361 generates the individual estimation model for B-scan image IMG-1 by performing supervised machine learning. Here, in the supervised machine learning, the B-scan images IMG-1 of the eyes of a plurality of other subjects excluding the subject's eye for which the feature amount is to be extracted are used as training data TR1, and the labels representing the classification result of the pathological condition of glaucoma according to Nicolela's classification by doctor(s) or other person(s) for each B-scan image are used as the teaching data SD1. The function of the individual estimation model for the B-scan image IMG-1 is realized by the first extractor 341 shown in FIG. 8.

For example, for the B-scan image IMG-2 in the vertical direction passing through the center (or near) of the optic disc, the first learning unit 361 generates the individual estimation model for the B-scan image IMG-2 by performing supervised machine learning. Here, in the supervised machine learning, the B-scan images IMG-2 of the eyes of a plurality of other subjects excluding the subject's eye for which the feature amount is to be extracted are used as training data TR1, and the labels representing the classification result of the pathological condition of glaucoma according to Nicolela's classification by doctor(s) or other person(s) for each B-scan image are used as the teaching data SD1. The function of the individual estimation model for the B-scan image IMG-2 is realized by the second extractor 342 shown in FIG. 8.

For example, for the B-scan image IMG-3 in the vertical direction passing through the fovea (or near), the first learning unit 361 generates the individual estimation model for B-scan image IMG-3 by performing supervised machine learning. Here, in the supervised machine learning, the B-scan images IMG-3 of the eyes of a plurality of other subjects excluding the subject's eye for which the feature amount is to be extracted are used as training data TR1, and the labels representing the classification result of the pathological condition of glaucoma according to Nicolela's classification by doctor(s) or other person(s) for each B-scan image are used as the teaching data SD1. The function of the individual estimation model for the B-scan image IMG-3 is realized by the third extractor 343 shown in FIG. 8.

For example, for the projection image IMG-4, the first learning unit 361 generates the individual estimation model for the projection image IMG-4 by performing supervised machine learning. Here, in the supervised machine learning, the projection images IMG-4 of the eyes of a plurality of other subjects excluding the subject's eye for which the feature amount is to be extracted are used as training data TR1, and the labels representing the classification result of the pathological condition of glaucoma according to Nicolela's classification by doctor(s) or other person(s) for each projection image are used as the teaching data SD1. The function of the individual estimation model for the projection image IMG-4 is realized by the fourth extractor 344 shown in FIG. 8.

For example, for the en-face image IMG-5, the first learning unit 361 generates the individual estimation model for the en-face image IMG-5 by performing supervised machine learning. Here, in the supervised machine learning, the projection images IMG-5 of the eyes of a plurality of other subjects excluding the subject's eye for which the feature amount is to be extracted are used as training data TR1, and the labels representing the classification result of the pathological condition of glaucoma according to Nicolela's classification by doctor(s) or other person(s) for each en-face image are used as the teaching data SD1. The function of the individual estimation model for the en-face image IMG-5 is realized by the fifth extractor 345 shown in FIG. 8.

For example, for the B-scan image IMG-6 in the vertical direction passing through midway between the center of the optic disc and the center of the fovea, the first learning unit 361 generates the individual estimation model for the B-scan image IMG-6 by performing supervised machine learning. Here, in the supervised machine learning, the B-scan images IMG-6 of the eyes of a plurality of other subjects excluding the subject's eye for which the feature amount is to be extracted are used as training data TR1, and the labels representing the classification result of the pathological condition of glaucoma according to Nicolela's classification by doctor(s) or other person(s) for each B-scan image are used as the teaching data SD1. The function of the individual estimation model for the B-scan image IMG-6 is realized by the sixth extractor 346 shown in FIG. 8.

For example, for the color fundus image IMG-7, the first learning unit 361 generates the individual estimation model for the fundus image IMG-7 by performing supervised machine learning. Here, in the supervised machine learning, the fundus image IMG-7 of the eyes of a plurality of other subjects excluding the subject's eye for which the feature amount is to be extracted are used as training data TR1, and the labels representing the classification result of the pathological condition of glaucoma according to Nicolela's classification by doctor(s) or other person(s) for each fundus image are used as the teaching data SD1. The function of the individual estimation model for the fundus image IMG-7 is realized by the seventh extractor 347 shown in FIG. 8.

Each of the above plurality of individual estimation models may have a similar configuration.

FIG. 9 shows a block diagram of an example of a configuration of the first extractor 341 according to the embodiments. Each of the second extractor 342 to the seventh extractor 347 may have the same configuration as in FIG. 9.

The function of the first extractor 341 is realized by a convolutional neural network (CNN), for example. That is, in the first extractor 341, in accordance with the commands from the individual estimation model stored in the memory, the computer operates so as to perform the calculation based on the learned weighting coefficients and response functions in the convolutional neural network on the pixel values of the image IMG-1 input to the convolution layer 3411 of the feature amount extractor 341A, which is the input layer, and to output the classification result from the classifier 341B, which is the output layer. The first extractor 341 having such a configuration can extract a local correlation pattern while gradually reducing the resolution of the image, and can output the classification result based on the extracted correlation pattern.

The first extractor 341 includes the feature amount extractor 341A and the classifier 341B. The feature amount extractor 341A repeats the extraction of the feature amount and the downsampling (filtering) for each predetermined image region with respect to the input image IMG-1 and extracts the feature amount of the determination image. The classifier 341B outputs the confidence score information OUT-1 to OUT-4 representing the confidence score of each of four types of the pathological condition of glaucoma according to Nicolela's classification, based on the feature amounts extracted by the feature amount extractor 341A.

The feature amount extractor 341A includes a plurality of units in which units are connected in a plurality of stages. Each unit includes a convolution layer and a pooling layer. In each unit, the inputs of the pooling layer are connected to the outputs of the convolution layer. The pixel values of the corresponding pixels in the image IMG-1 are input to the inputs of the convolution layer in the first stage. The inputs of the convolution layer in the latter stage are connected to the outputs of the pooling layer in the previous stage.

In FIG. 9, the feature amount extractor 341A includes two units connected in two stages. That is, in the feature amount extractor 341A, the unit including the convolution layer 3413 and the pooling layer 3414 are connected to the subsequent stage of the unit including the convolution layer 3411 and the pooling layer 3412. The outputs of the pooling layer 3412 are connected to the inputs of the convolution layer 3413.

The classifier 341B includes fully connected layers 3415 and 3416. The outputs of the fully connected layer 3415 are connected to the inputs of the fully connected layer 3416.

In the feature amount extractor 341A and the classifier 341B, learned weighting coefficients are assigned between the neurons in the two connected layers. Each neuron performs calculation using a response function on calculation result in which weighting coefficient(s) from one or more input neurons is/are added, and outputs the obtained calculation result to a neuron in the next stage.

The weighting coefficient(s) is/are updated by performing known machine learning. Here, in the machine learning, the images IMG-1 of the eyes of the two or more subjects acquired in the past (B-scan images in the horizontal direction passing through the center (or near) of the optic disc) are used as training data, and labels labeled by the doctor(s) or other person(s) for each image are used as teaching data. The existing weighting coefficient(s) is/are updated by performing machine learning using the images acquired in the past as training data. In some embodiments, the weighting coefficient(s) is/are updated by transfer learning.

The first extractor 341 may have a known layered structure such as VGG16, VGG19, InceptionV3, ResNet18, ResNet50, Xception, DenseNet 201. The classifier 341B may have a configuration such as random forest, support vector machine (SVM).

In FIG. 8, the second learning unit 363 generates the classification model by performing supervised machine learning, as described above. In the supervised machine learning, the feature amounts TR2 of the images IMG-1 to IMG-7 for training and the background data BG selected by the feature selector 362 are used as training data, and the classification results of the pathological condition of glaucoma classified by doctor(s) or other(s) according to Nicolela's classification are used as teaching data SD2.

As described above, the feature amount extractor 340 extracts the feature amounts for each of the seven types of images IMG-1 to IMG-7 of the subject's eye E, using the first extractor 341 to the seventh extractor 347 that realize the functions of the individual estimation models generated for each image by the first learning unit 361. The feature amount may be confidence score information for each of the four types of the pathological condition of glaucoma classified according to Nicolela's classification for each image. The classifier 350 outputs the confidence score information (information on the estimated probability of being each type) of the each of the four types of the pathological condition of glaucoma according to Nicolela's classification, from the feature amounts extracted by the first extractor 341 to the seventh extractor 347 and the one or more background data selected by the feature selector 362, using the classification model generated by the second learning unit 363. The confidence score information OUT-1 is confidence score information representing that glaucoma developing in the subject's eye is Focal Ischemia type (FI). The confidence score information OUT-2 is confidence score information representing that glaucoma developing in the subject's eye is Myopic type (MY). The confidence score information OUT-3 is confidence score information representing that glaucoma developing in the subject's eye is Senile Sclerotic type (SS). The confidence score information OUT-4 is confidence score information representing that glaucoma developing in the subject's eye is General Enlargement type (GE).

In some embodiments, the classifier 350 (or data processor 300) outputs estimation information for estimating the type of the pathological condition of glaucoma developing in the subject's eye, based on the confidence score information OUT-1 to OUT-4. For example, the classifier 350 outputs, for example, the type with the highest confidence score among the confidence score information OUT-1 to OUT-4 as the estimated result of the type of the pathological condition of glaucoma developing in the subject's eye.

(User Interface)

As shown in FIG. 4, the user interface 240 includes the display unit 240A and the operation unit 240B. The display unit 240A includes the display apparatus 3 and the display device. The operation unit 240B includes the operation device of the arithmetic control unit 200 described above. The operation unit 240B may include various kinds of buttons and keys provided on the housing of the ophthalmic apparatus 1, or provided outside the ophthalmic apparatus 1. For example, when the fundus camera unit 2 has a case similar to that of the conventional fundus camera, the operation unit 240B may include a joy stick, an operation panel, and the like provided to the case. Further, the display unit 240A may include various kinds of display devices, such as a touch panel placed on the housing of the fundus camera unit 2.

It should be noted that the display unit 240A and the operation unit 240B need not necessarily be formed as separate devices. For example, a device like a touch panel, which has a display function integrated with an operation function, can be used. In such cases, the operation unit 240B includes the touch panel and a computer program. The content of operation performed on the operation unit 240B is fed to the controller 210 as an electric signal. Moreover, operations and inputs of information may be performed using a graphical user interface (GUI) displayed on the display unit 240A and the operation unit 240B.

The data processor 300 is an example of the "ophthalmic information processing apparatus" according to the embodiments. The first extractor 341 to the seventh extractor 347 are an example of the "two or more extractors" according to the embodiments. The feature selector 362 is an example of the "feature selector" according to the embodiments. The second learning unit 363 is an example of the "learning unit" according to the embodiments. The images IMG-1 to IMG-6 are examples of the "OCT images" according to the embodiments. The color fundus image IMG-7 is an example of the "color image of an eye of a subject" according to the embodiments. The projection image IMG-4 and the en-face image IMG-5 are examples of the "front image" according to the embodiments. The B-scan images IMG-1 to IMG-3 and IMG-6 are examples of the "tomographic image" according to the embodiments. The optical system included in the fundus camera unit 2 and the OCT unit 100 is an example of the "optical system" according to the embodiments.

[Operation]

The operation of the ophthalmic apparatus 1 according to the embodiments will be described.

Figure 10:
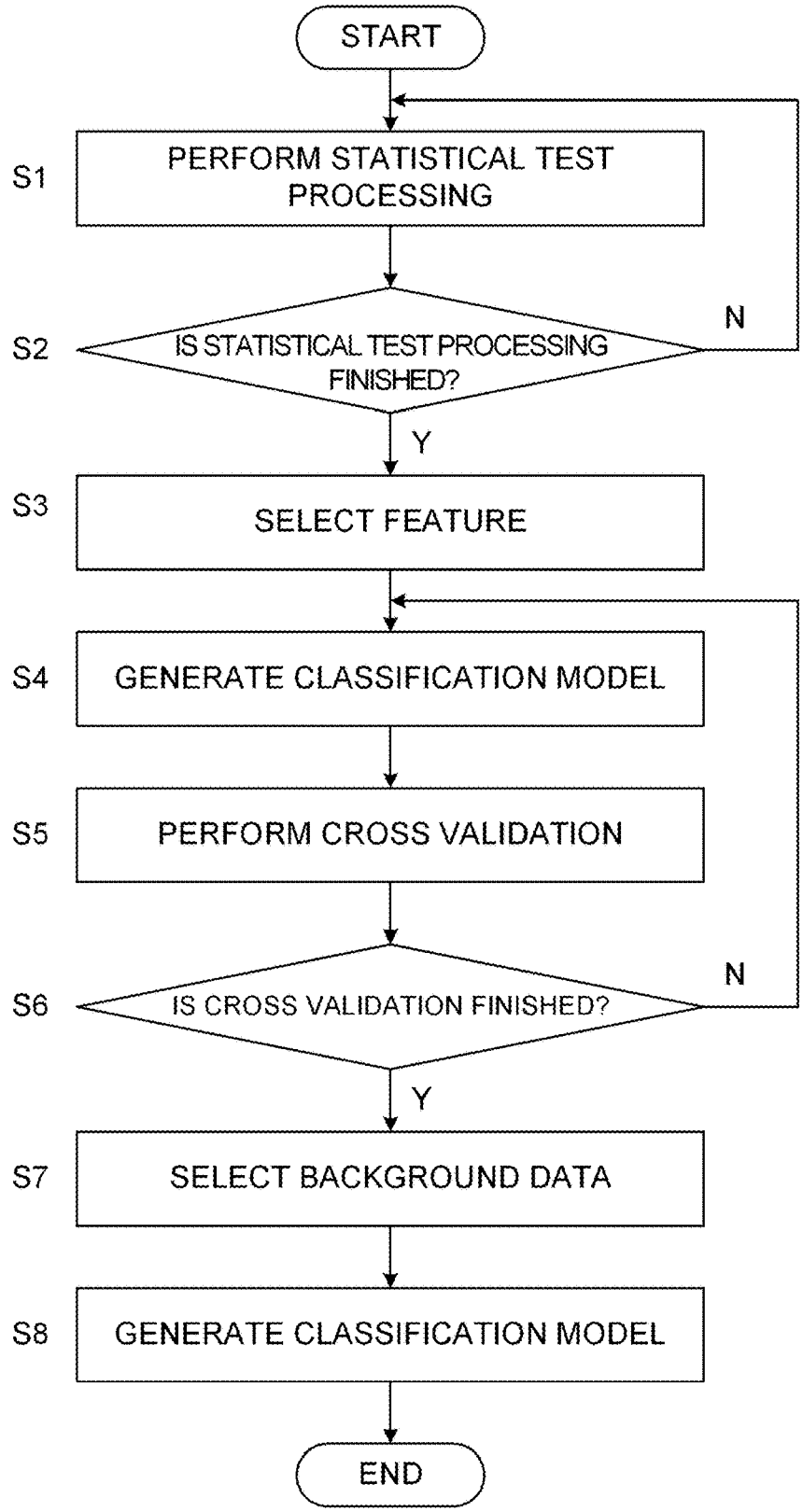
FIG. 10 is a schematic diagram illustrating an example of an operation flow of the ophthalmic apparatus according to the embodiments.

FIG. 10 and FIG. 11 show flowcharts of examples of the operation of the ophthalmic apparatus 1 according to the embodiments. FIG. 10 represents a flowchart of an example of the generation processing of the individual estimation model of the feature amount extractor 340 and the classification model of the classifier 350. FIG. 11 represents a flowchart of an example of the classification processing of the pathological condition of glaucoma using the individual estimation models and the classification model generated in the generation processing shown in FIG. 10. The storage unit 212 stores computer programs for realizing the processing shown in FIG. 10 and FIG. 11. The controller 210 (main controller 211) can perform the processing shown in FIG. 10 and FIG. 11 by operating according to the computer programs.

The processing shown in FIG. 10 is performed prior to the performance of the processing shown in FIG. 11. In FIG. 10, it is assumed that a plurality of images IMG-1 to IMG-7 for training has been acquired in advance.

(S1: Perform Statistical Test Processing)

First, the main controller 211 controls the feature selector 362 to perform statistical test processing on the two or more background data.

The statistical tester 362A in the feature selector 362 performs statistical test processing as shown in FIG. 7A to FIG. 7H on one of a predetermined two or more background data BG0 to calculate the p-value. For example, the two or more background data BG0 include the 9-dimensional data including the age of the subject, the gender of the subject, the axial length of the subject's eye, the MD value of the subject's eye, the equivalent spherical power of the subject's eye, the MT value of the subject's eye, the minimum intraocular pressure value over the past year, the maximum intraocular pressure value over the past year, and the average intraocular pressure value over the past year.

(S2: Is Statistical Test Processing Finished?)

Subsequently, the main controller 211 determines whether or not the statistical test processing in step S1 is finished. For example, the main controller 211 determines whether or not the statistical test processing in step S1 is finished by determining whether or not step S1 has been performed for all two or more background data BG0.

When it is determined that the statistical test processing in step S1 is finished (step S2: Y), the operation of the ophthalmic apparatus 1 proceeds to step S3. When it is determined that the statistical test processing in step S1 is not finished (step S2: N), the operation of the ophthalmic apparatus 1 proceeds to step S1.

(S3: Select Feature)

When it is determined in step S2 that the statistical test processing in step S1 is finished (step S2: Y), the main controller 211 controls the statistical tester 362A to select the background data that is judged to be effective in classifying the pathological condition of glaucoma among the two or more background data obtained by repeatedly performing the statistical test processing in step S1.

For example, the statistical tester 362A identifies the background data, in which the p-value is less than 0.01, as background data BG1 among the two or more background data BG0. For example, it is assumed that the two or more background data BG1 include the 6-dimensional data including the age of the subject, the axial length of the subject's eye, the MD value of the subject's eye, the equivalent spherical power of the subject's eye, the MT value of the subject's eye, and the minimum intraocular pressure value over the past year. It should be noted that the type of data identified as the background data BG1 may differ depending on the distribution of the background data used in the statistical test processing.

(S3: Generate Classification Model)

Subsequently, the main controller 211 controls the background data selector 362B to select one of the combinations of the s-dimensional (s is an integer greater than or equal to 1) background data among the 6-dimensional background data BG1 identified in step S2.

For example, when selecting 1-dimensional data, the background data selector 362B selects one of the 6 ways of data among the 6-dimensional background data BG1. For example, when selecting 2-dimensional data, the background data selector 362B selects one of the 15 (=6×5/2) ways of data from the 6-dimensional background data BG1. For example, when selecting 3-dimensional data, the background data selector 362B selects one of the 20 (=6×5×4/6) ways of data from the 6-dimensional background data BG1. The same can be applied for 4-dimensional data, 5-dimensional and 6-dimensional data.

After then, the main controller 211 controls the second learning unit 363 to generate the classification model by performing machine learning using the feature amounts of the images IMG-1 to IMG-7 for training extracted by the feature amount extractor 340 and the s-dimensional background data selected by the background data selector 362B.

(S5: Perform Cross Validation)

Subsequently, the main controller 211 controls the cross validator 362C to perform cross validation using the feature amounts FA of each of the images IMG-1 to IMG-7 for training extracted by the feature amount extractor 340 and the s-dimensional background data selected by the background data selector 362B.

The cross validator 362C, for example, performs 5-fold cross validation and calculates the average of the five accuracies.

(S6: Is Cross Validation Finished?)

Next, the main controller 211 determines whether or not the cross validation in step S5 is finished. For example, the main controller 211 determines whether or not the cross validation in step S5 is finished by determining whether or not step S5 has been performed for all combinations of s-dimensions among the two or more background data BG1 (e.g., 6-dimensional background data).

When it is determined that the cross validation in step S5 is finished (step S6: Y), the operation of the ophthalmic apparatus 1 proceeds to step S7. When it is determined that the cross validation in step S5 is not finished (step S6: N), the operation of the ophthalmic apparatus 1 proceeds to step S4.

(S7: Select Background Data)

When it is determined in step S6 that the cross validation in step S5 is finished (step S6: Y), the main controller 211 controls the background data selector 362B to select the combination of the background data with the highest accuracy among all combinations of the background data in the 6-dimensions as the background data BG. It should be noted that the type of data identified as the background data BG may differ depending on the images for training and/or the distribution of the background data.

(S8: Generate Classification Model)

The main controller 211 again controls the second learning unit 363 to generate the classification model by performing machine learning using the feature amounts of the images IMG-1 to IMG-7 for training extracted by the feature amount extractor 340 and the background data BS selected in step S7.

This terminates the operation of the ophthalmic apparatus 1 (END).

Once the classification model is generated as shown in FIG. 10, the ophthalmic apparatus 1 outputs the confidence score information OUT-1 to OUT-4 for estimating the classification results of the pathological condition of glaucoma for the image of the subject's eye E to be classified for the pathological condition of glaucoma, according to the flow shown in FIG. 11.

In FIG. 11, it is assumed that the individual estimation models have been generated in advance in the ophthalmic apparatus 1.

(S11: Generate Image from OCT Data)

First, the main controller 211 controls the OCT unit 100, etc. to perform OCT on the subject's eye E and to acquire the three-dimensional OCT data of the subject's eye E. Subsequently, the main controller 211 controls the image forming unit 230 and the data processor 230 to generate the images IMG-1 to IMG-6 from the three-dimensional OCT data.

(S12: Acquire Fundus Image)

Next, the main controller 211 controls the fundus camera unit 2, etc. to photograph the fundus Ef of the subject's eye E and to acquire the color fundus image IMG-7 of the fundus Ef.

(S13: Acquire Background Data)

Next, the main controller 211 acquires the background data of the subject's eye E for each of the background data selected in step S7 of FIG. 10. In some embodiments, the main controller 211 controls a communication unit (not shown) to acquire the background data of the subject's eye E from electronic medical record or an external ophthalmic apparatus via a network. In some embodiments, the main controller 211 acquires the background data input by the user using the operation unit 240B.

(S14: Classify Pathological Condition of Glaucoma)

Next, the main controller 211 controls the feature amount extractor 340 and the classifier 350 to input the images IMG-1 to IMG-7 of the subject's eye E acquired in step S11 and step S12 and the background data acquired in step S13 and to output the confidence score information OUT-1 to OUT-4 for estimating the pathological condition of glaucoma, using the individual estimation models already generated and the classification model generated as shown in FIG. 10.

This terminates the operation of the ophthalmic apparatus 1 (END).

Here, the accuracy of the classification results of the pathological condition of glaucoma obtained by the ophthalmic apparatus 1 according to the embodiments will be described.

FIG. 12 shows a diagram for explaining the degree of accuracy of the classification results of the pathological condition of glaucoma obtained by the ophthalmic apparatus 1 according to the embodiments, when the type of input image of the subject's eye is increased. In FIG. 12, κ-value (kappa value) (kappa coefficient, kappa statistic) is used as an indicator of the degree of accuracy of the classification results.

In FIG. 12, when the classification of the pathological condition of glaucoma is performed using the images IMG-1, IMG-2, IMG-4, and IMG-5 with the ophthalmic apparatus 1 according to the embodiments, the κ-value is "0.654". And when the classification of the pathological condition of glaucoma is performed using the images IMG-1 to IMG-5, the κ-value is "0.661". In the same way, when the classification of the pathological condition of glaucoma is performed using the images IMG-1, IMG-2, and IMG-4 to IMG-6, the κ-value is "0.663". And when the classification of the pathological condition of glaucoma is performed using the images IMG-1, IMG-2, IMG-4, IMG-5, and IMG-7, the κ-value is "0.728". Further, when the classification of the pathological condition of glaucoma is performed using the images IMG-1 to IMG-7, the κ-value is "0.733".

In other words, by increasing the number of types of image of the subject's eye and classifying the pathological condition of glaucoma using the images IMG-1 to IMG-7, the degree of accuracy of the classification results of the pathological condition of glaucoma can be improved.

FIG. 13 shows an example of the precision, the recall, and the accuracy for each type, when the pathological condition of glaucoma is classified according to Nicolela's classification using the images IMG-1 to IMG-7 with the ophthalmic apparatus 1 according to the embodiments.

In FIG. 13, when the pathological condition of glaucoma is classified according to Nicolela's classification using the images IMG-1 to IMG-7, the accuracy is "82.4%".

FIG. 14 shows an example of the classification results when the background data is added to the classification of the pathological condition of glaucoma by the ophthalmic apparatus 1, as in the embodiments described above.

As shown in FIG. 14, when the classification of the pathological condition of glaucoma is performed without adding the background data, the accuracy is "78.2%". In contrast, when the background data is added and the classification of the pathological condition of glaucoma is performed, as in the above embodiments, the accuracy is "80.2%".

In other words, by adding the background data to classify the pathological condition of glaucoma in addition to the above increase in the types of the image, the degree of accuracy of the classification results of the pathological condition of glaucoma can be improved.

FIG. 15 shows an example of the classification results when the background data selected by performing feature selection as in the embodiments described above is added to the classification of the pathological condition of glaucoma by the ophthalmic apparatus 1.

As shown in FIG. 15, when the classification of the pathological condition of glaucoma is performed by adding the background data without the feature selection, the accuracy is "80.2%" (as in FIG. 14). In contrast, when the background data selected by performing feature selection as in the embodiments described above is added to classify the pathological condition of glaucoma, the accuracy is "81.4%".

In other words, by adding the background data selected by performing feature selection to classify the pathological condition of glaucoma in addition to the above increase in the types of the image, the degree of accuracy of the classification results of the pathological condition of glaucoma can be improved.

Modification Example

In the embodiments described above, a case where the ophthalmic apparatus having the OCT optical system and the imaging optical system, the imaging optical system configured to image the fundus, has the function of the data processor 300 has been described. However, the configuration according to the embodiments is not limited thereto. For example, the functions of the data processor 300 according to the embodiments may be provided outside of the ophthalmic apparatus.

Figure 16:
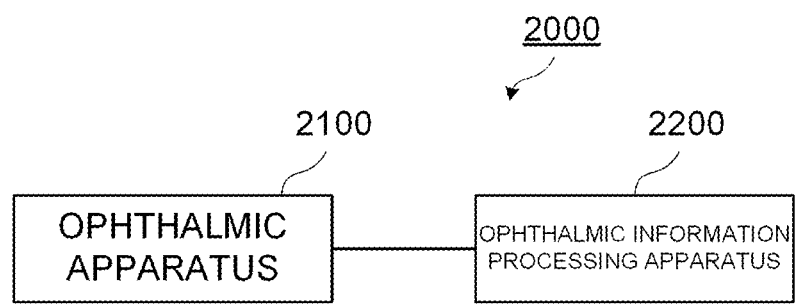
FIG. 16 is a schematic diagram illustrating an example of a configuration of an ophthalmic system according to a modification example of the embodiments.

FIG. 16 shows a block diagram of an example of a configuration of an ophthalmic system according to a modification example of the embodiments.

An ophthalmic system 2000 according to the present modification example includes an ophthalmic apparatus 2100 and an ophthalmic information processing apparatus 2200. The ophthalmic system 2000 realizes the same functions as the ophthalmic apparatus 1 according to the embodiments, using the ophthalmic apparatus 2100 and the ophthalmic information processing apparatus 2200. The ophthalmic information processing apparatus 2200 has at least part of the functions of the data processor 300 in FIG. 5. For example, the ophthalmic information processing apparatus 2200 has the functions of the feature amount extractor 340, the classifier 350, and the learning unit 360. The functions of the ophthalmic information processing apparatus 2200 are realized by a computer including a processor, for example.

For example, the ophthalmic apparatus 2100 has a configuration that omits the configuration of the ophthalmic information processing apparatus 2200 from the configuration of the ophthalmic apparatus 1 according to the embodiments.

Figure 17:
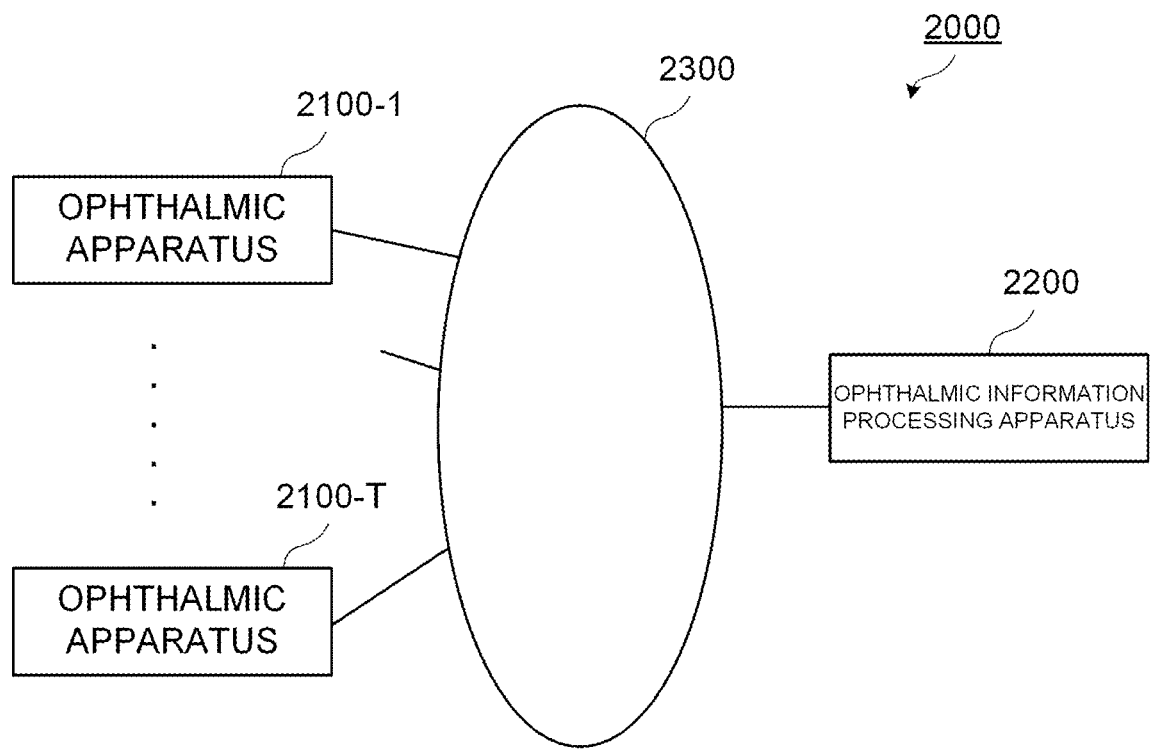
FIG. 17 is a schematic diagram illustrating an example of a configuration of an ophthalmic system according to the modification example of the embodiments.

FIG. 17 shows a block diagram of an example of a configuration of the ophthalmic system according to another modification example of the embodiments.

The ophthalmic system 2000 according to the present modification example includes ophthalmic apparatuses 2100-1 to 2100-T (T is an integer of two or more) and the ophthalmic information processing apparatus 2200. The ophthalmic information processing apparatus 2200 is configured to be able to establish a communication connection with any of the ophthalmic apparatuses 2100-1 to 2100-T via a network 2300. As in FIG. 16, the ophthalmic information processing apparatus 2200 has at least part of the functions of the data processor 300 in FIG. 5. For example, the ophthalmic information processing apparatus 2200 has the functions of the feature amount extractor 340, the classifier 350, and the learning unit 360. The functions of the ophthalmic information processing apparatus 2200 are realized by a computer including a processor, for example.

For example, the ophthalmic apparatuses 2100-1 to 2100-T have the same functions as the ophthalmic apparatus 2100.

<Actions>

The ophthalmic information processing apparatus, the ophthalmic apparatus, the ophthalmic information processing method, and the program according to the embodiments will be described.

An ophthalmic information processing apparatus (data processor 300, ophthalmic information processing apparatus 1000, 2200) according to some embodiments includes a feature amount extractor (1100, 340) and a classifier (1200, 350). The feature amount extractor is configured to extract a feature amount of each of two or more images (IMG-1 to IMG-7) different from each other of a subject's eye. The classifier is configured to output two or more confidence score information (OUT-1 to OUT-4) for estimating classification result of a pathological condition of a disease of the subject's eye, based on the feature amounts of each of the two or more images extracted by the feature amount extractor and one or more background data (BG) representing a state of the subject or a state of the subject's eye.

According to such an aspect, the two or more confidence score information for estimating the classification result of the pathological condition of the disease of the subject's eye are output using the one or more background data described above. Therefore, the degree of accuracy of the classification result of the pathological condition can be improved compared to the case where the confidence score information is output based on the feature amount of the image alone. Thereby, appropriate treatment for the disease of the subject's eye can be provided at an early stage.

In some embodiments, the feature amount extractor includes two or more extractors (first extractor 341 to seventh extractor 347) configured to extract the feature amounts using two or more learned models obtained by performing supervised machine learning for each of the images. The classifier is configured to output the two or more confidence score information using a classification model obtained by performing supervised machine learning using feature amounts (TR2) of images of eyes of a plurality of subjects for training and background data (BG) of the subjects or the eyes of the subjects as training data and classification results of relevant images as teaching data (SD2).

According to such an aspect, the confidence score information is output from the feature amounts for each of the types of the images and the background data, using the classification model obtained by performing machine learning. Thereby, highly accurate confidence score information can be output.

In some embodiments, the ophthalmic information processing apparatus further includes a feature selector (feature selector 362) configured to select the one or more background data by performing statistical test on two or more background data for each of a plurality of subjects with the disease.

According to such an aspect, the confidence score information is output using the background data that is likely to contribute to the output of highly accurate confidence score information. Thereby, the degree of accuracy of the confidence score information can be further enhanced.

In some embodiments, the ophthalmic information processing apparatus further includes a learning unit (second learning unit 363) configured to generate the classification model by performing supervised machine learning using the feature amounts of images of eyes of a plurality of subjects for training data and the one or more background data as training data and classification results of relevant images as teaching data.

According to such an aspect, the highly accurate confidence score information can be output from the feature amounts for each of the types of the images and the background data.

In some embodiments, the feature amount includes confidence score information for estimating a classification result of the pathological condition.

According to such an aspect, the two or more confidence score information for estimating the classification result of the pathological condition of the disease of the subject's eye are output using the confidence score information for each image and the one or more background data described above. Therefore, the degree of accuracy of the classification result of the pathological condition can be improved.

In some embodiments, the two or more images include OCT images (images IMG-1 to IMG-6) acquired by performing optical coherence tomography on the eye of the subject and a color image (color fundus image IMG-7) of the eye of the subject.

According to such an aspect, highly accurate confidence score information can be output from the OCG images and the color image.

In some embodiments, the OCT images include at least one of a front image (projection image IMG-4, en-face image IMG-5) of a fundus or a tomographic image (B-scan images IMG-1 to IMG-3 and IMG-6) of the fundus. The color image includes a color image of the fundus (fundus image IMG-7). The two or more confidence score information includes confidence score information (OUT-1 to OUT-4) for estimating a classification result of types of a pathological condition of glaucoma according to Nicolela's classification.

According to such an aspect, the confidence score information that can estimate the classification result of the pathological condition of glaucoma according to Nicolela's classification with high accuracy can be output.

In some embodiments, the OCT images includes a B-scan image (IMG-1) in a first direction (horizontal direction) passing through a center of an optic disc, a B-scan image (IMG-2) in a second direction (vertical direction) intersecting the first direction, the second direction passing through a center of an optic disc, a B-scan image (IMG-3) in the second direction passing through a center of a fovea, a projection image (IMG-4), an en-face image (IMG-5), and a B-scan image (IMG-6) passing through midway between the center of the optic disc and the center of the fovea.

According to such an aspect, the confidence score information that can estimate the classification result of the pathological condition of glaucoma according to Nicolela's classification with high accuracy can be output, reflecting the morphology of the optic disc and the fovea.

In some embodiments, the background data includes at least one of an axial length, an MD value, an equivalent spherical power, an age, an optic disc tissue blood flow value, or a minimum intraocular pressure value over the past year.

According to such an aspect, more highly accurate confidence information can be output.

In some embodiments, the two or more confidence score information includes confidence score information representing confidence score information that the glaucoma is a Focal Ischemia type, confidence score information representing that the glaucoma is a Myopic type, confidence score information representing confidence score information that the glaucoma is a Senile Sclerotic type, and confidence score information representing confidence score information that the glaucoma is a General Enlargement type.

According to such an aspect, the confidence score information representing the confidence sore of each of the four types of the pathological condition of glaucoma can be output.

An ophthalmic apparatus (1) according to some embodiments includes an optical system (optical system included in the fundus camera unit 2 and the OCT unit 100) configured to acquire the two or more image described above, and the ophthalmic information processing apparatus described any one of the above.

According to such an aspect, the two or more confidence score information for estimating the classification result of the pathological condition of the disease of the subject's eye are output using the one or more background data described above. Thereby, the ophthalmic apparatus that can improve the degree of accuracy of the classification result of the pathological condition compared to the case where the confidence score information is output based on the feature amount of the image alone can be provided.

An ophthalmic information processing method according to some embodiments includes a feature amount extracting step of extracting a feature amount of each of two or more images different from each other of a subject's eye; and a classifying step of outputting two or more confidence score information for estimating classification result of a pathological condition of a disease of the subject's eye, based on the feature amounts of each of the two or more images extracted in the feature amount extracting step and one or more background data representing a state of the subject or a state of the subject's eye.

According to such an aspect, the two or more confidence score information for estimating the classification result of the pathological condition of the disease of the subject's eye are output using the one or more background data described above. Therefore, the degree of accuracy of the classification result of the pathological condition can be improved compared to the case where the confidence score information is output based on the feature amount of the image alone. Thereby, appropriate treatment for the disease of the subject's eye can be provided at an early stage.

In some embodiments, the feature amount extracting step is performed to extract the feature amounts using two or more learned models obtained by performing supervised machine learning for each of the images. The classifying step is performed to output the two or more confidence score information using a classification model obtained by performing supervised machine learning using feature amounts of images of eyes of a plurality of subjects for training and background data of the subjects or the eyes of the subjects as training data and classification results of relevant images as teaching data.

According to such an aspect, the confidence score information is output from the feature amounts for each of the types of the images and the background data, using the classification model obtained by performing machine learning. Thereby, highly accurate confidence score information can be output.

The ophthalmic information processing method according to some embodiments further includes a feature selecting step of selecting the one or more background data by performing statistical test on two or more background data for each of a plurality of subjects with the disease.

According to such an aspect, the confidence score information is output using the background data that is likely to contribute to the output of highly accurate confidence score information. Thereby, the degree of accuracy of the confidence score information can be further enhanced.

The ophthalmic information processing method according to some embodiments further includes a learning step of generating the classification model by performing supervised machine learning using the feature amounts of images of eyes of a plurality of subjects for training data and the one or more background data as training data and classification results of relevant images as teaching data.

According to such an aspect, the highly accurate confidence score information can be output from the feature amounts for each of the types of the images and the background data.

In some embodiments, the feature amount includes confidence score information for estimating a classification result of the pathological condition.

According to such an aspect, the two or more confidence score information for estimating the classification result of the pathological condition of the disease of the subject's eye are output using the confidence score information for each image and the one or more background data described above. Therefore, the degree of accuracy of the classification result of the pathological condition can be improved.

In some embodiments, the two or more images include OCT images of a fundus acquired by performing optical coherence tomography on the eye of the subject and a color image of the fundus. The two or more confidence score information includes confidence score information for estimating a classification result of a pathological condition of glaucoma according to Nicolela's classification.

According to such an aspect, the highly accurate classification result of the pathological condition of glaucoma according to Nicolela's classification can be output from the OCG images and the color image.

In some embodiments in the first aspect, the OCT images includes a B-scan image in a first direction passing through a center of an optic disc, a B-scan image in a second direction intersecting the first direction, the second direction passing through a center of an optic disc, a B-scan image in the second direction passing through a center of a fovea, a projection image, an en-face image, and a B-scan image passing through midway between the center of the optic disc and the center of the fovea.

According to such an aspect, the confidence score information that can estimate the classification result of the pathological condition of glaucoma according to Nicolela's classification with high accuracy can be output, reflecting the morphology of the optic disc and the fovea.

In some embodiments, the background data includes at least one of an axial length, an MD value, an equivalent spherical power, an age, an optic disc tissue blood flow value, or a minimum intraocular pressure value over the past year.

According to such an aspect, more highly accurate confidence information can be output.

In some embodiments, the two or more confidence score information includes confidence score information representing confidence score information that the glaucoma is a Focal Ischemia type, confidence score information representing that the glaucoma is a Myopic type, confidence score information representing confidence score information that the glaucoma is a Senile Sclerotic type, and confidence score information representing confidence score information that the glaucoma is a General Enlargement type.

According to such an aspect, the confidence score information representing the confidence sore of each of the four types of the pathological condition of glaucoma can be output.

A program according to some embodiments causes a computer to execute each step of the ophthalmic information processing method described in any one of the above.

According to such an aspect, the two or more confidence score information for estimating the classification result of the pathological condition of the disease of the subject's eye are output using the one or more background data described above. Thereby, the program that can improve the degree of accuracy of the classification result of the pathological condition compared to the case where the confidence score information is output based on the feature amount of the image alone can be provided.

A program for realizing the ophthalmic information processing method according to some embodiments can be stored in any kind of non-transitory computer-readable recording medium. The recording medium may be an electronic medium using magnetism, light, magneto-optical, semiconductor, or the like. Typically, the recording medium is a magnetic tape, a magnetic disk, an optical disk, a magneto-optical disk, a flash memory, a solid state drive, or the like.

The computer program may be transmitted and received through a network such as the Internet, LAN, etc.

Configurations described above are merely examples for preferably implementing the present invention. One who intends to implement the present invention may arbitrarily modify (omission, replacement, addition, etc.) within the scope of the invention.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ophthalmic information processing apparatus, comprising:
    processing circuitry configured as a feature amount extractor configured to extract a feature amount of each of two or more images different from each other of a subject's eye; and
    the processing circuitry further configured as a classifier configured to output two or more confidence score information for estimating classification result of a pathological condition of a disease of the subject's eye, based on the feature amounts of each of the two or more images extracted by the feature amount extractor and one or more background data representing a state of the subject or a state of the subject's eye, wherein
    the feature amount extractor includes two or more extractors configured to extract the feature amounts using two or more learned models obtained by performing supervised machine learning for each of the images, and
    the classifier is configured to output the two or more confidence score information using a classification model obtained by performing supervised machine learning using feature amounts of images of eyes of a plurality of subjects for training and the one or more background data of the subjects or the eyes of the subjects as training data, and classification results of relevant images as teaching data.

2. The ophthalmic information processing apparatus of claim 1, wherein the processing circuitry is further configured as a feature selector configured to select the one or more background data by performing statistical test on two or more of the one or more background data for each of a plurality of subjects with the disease.

3. The ophthalmic information processing apparatus of claim 1, wherein the processing circuitry is further configured as a learning unit configured to generate the classification model by performing supervised machine learning using the feature amounts of images of eyes of a plurality of subjects for training data and the one or more background data as training data, and classification results of relevant images as teaching data.

4. The ophthalmic information processing apparatus of claim 1, wherein the feature amount includes confidence score information for estimating a classification result of the pathological condition.

5. The ophthalmic information processing apparatus of claim 1, wherein the two or more images include OCT images acquired by performing optical coherence tomography on the eye of the subject and a color image of the eye of the subject.

6. The ophthalmic information processing apparatus of claim 5, wherein the OCT images include at least one of a front image of a fundus or a tomographic image of the fundus,
the color image includes a color image of the fundus, and
the two or more confidence score information includes confidence score information for estimating a classification result of types of a pathological condition of glaucoma according to Nicolela's classification.

7. The ophthalmic information processing apparatus of claim 6, wherein the OCT images includes a B-scan image in a first direction passing through a center of an optic disc, a B-scan image in a second direction intersecting the first direction, the second direction passing through the center of the optic disc, a B-scan image in the second direction passing through a center of a fovea, a projection image, an en-face image, and a B-scan image passing through midway between the center of the optic disc and the center of the fovea.

8. The ophthalmic information processing apparatus of claim 6, wherein the one or more background data includes at least one of an axial length, an MD value, an equivalent spherical power, an age, an optic disc tissue blood flow value, or a minimum intraocular pressure value over the past year.

9. The ophthalmic information processing apparatus of claim 6, wherein the two or more confidence score information includes confidence score information representing confidence score information that the glaucoma is a Focal Ischemia type, confidence score information representing that the glaucoma is a Myopic type, confidence score information representing confidence score information that the glaucoma is a Senile Sclerotic type, and confidence score information representing confidence score information that the glaucoma is a General Enlargement type.

10. An ophthalmic apparatus, comprising:
    an optical system configured to acquire two or more images; and
    an ophthalmic information processing apparatus, wherein the ophthalmic information processing apparatus includes:
        processing circuitry configured as a feature amount extractor configured to extract a feature amount of each of the two or more images different from each other of a subject's eye; and
        the processing circuitry further configured as a classifier configured to output two or more confidence score information for estimating classification result of a pathological condition of a disease of the subject's eye, based on the feature amounts of each of the two or more images extracted by the feature amount extractor and one or more background data representing a state of the subject or a state of the subject's eye, wherein
    the feature amount extractor includes two or more extractors configured to extract the feature amounts using two or more learned models obtained by performing supervised machine learning for each of the images, and
    the classifier is configured to output the two or more confidence score information using a classification model obtained by performing supervised machine learning using feature amounts of images of eyes of a plurality of subjects for training and the one or more background data of the subjects or the eyes of the subjects as training data, and classification results of relevant images as teaching data.

11. An ophthalmic information processing method, comprising:

a feature amount extracting step of extracting a feature amount of each of two or more images different from each other of a subject's eye; and a classifying step of outputting two or more confidence score information for estimating classification result of a pathological condition of a disease of the subject's eye, based on the feature amounts of each of the two or more images extracted in the feature amount extracting step and one or more background data representing a state of the subject or a state of the subject's eye, wherein the feature amount extracting step is performed to extract the feature amounts using two or more learned models obtained by performing supervised machine learning for each of the images, and the classifying step is performed to output the two or more confidence score information using a classification model obtained by performing supervised machine learning using feature amounts of images of eyes of a plurality of subjects for training and the one or more background data of the subjects or the eyes of the subjects as training data, and classification results of relevant images as teaching data.

12. The ophthalmic information processing method of claim 11, further comprising a feature selecting step of selecting the one or more background data by performing statistical test on two or more background data for each of a plurality of subjects with the disease.

13. The ophthalmic information processing method of claim 11, further comprising a learning step of generating the classification model by performing supervised machine learning using the feature amounts of images of eyes of a plurality of subjects for training data, and the one or more background data as training data, and classification results of relevant images as teaching data.

14. The ophthalmic information processing method of claim 11, wherein the feature amount includes confidence score information for estimating a classification result of the pathological condition.

15. The ophthalmic information processing method of claim 11, wherein the two or more images include OCT images of a fundus acquired by performing optical coherence tomography on the eye of the subject and a color image of the fundus, and the two or more confidence score information includes confidence score information for estimating a classification result of types of a pathological condition of glaucoma according to Nicolela's classification.

16. The ophthalmic information processing method of claim 15, wherein the OCT images includes a B-scan image in a first direction passing through a center of an optic disc, a B-scan image in a second direction intersecting the first direction, the second direction passing through the center of the optic disc, a B-scan image in the second direction passing through a center of a fovea, a projection image, an en-face image, and a B-scan image passing through midway between the center of the optic disc and the center of the fovea.

17. The ophthalmic information processing method of claim 15, wherein the one or more background data includes at least one of an axial length, an MD value, an equivalent spherical power, an age, an optic disc tissue blood flow value, or a minimum intraocular pressure value over the past year.

18. The ophthalmic information processing method of claim 15, wherein the two or more confidence score information includes confidence score information representing confidence score information that the glaucoma is a Focal Ischemia type, confidence score information representing that the glaucoma is a Myopic type, confidence score information representing confidence score information that the glaucoma is a Senile Sclerotic type, and confidence score information representing confidence score information that the glaucoma is a General Enlargement type.

19. A computer readable non-transitory recording medium in which a program for causing a computer to execute each step of an ophthalmic information processing method is recorded, wherein the ophthalmic information processing method includes:

a feature amount extracting step of extracting a feature amount of each of two or more images different from each other of a subject's eye; and a classifying step of outputting two or more confidence score information for estimating classification result of a pathological condition of a disease of the subject's eye, based on the feature amounts of each of the two or more images extracted in the feature amount extracting step and one or more background data representing a state of the subject or a state of the subject's eye, wherein the feature amount extracting step is performed to extract the feature amounts using two or more learned models obtained by performing supervised machine learning for each of the images, and the classifying step is performed to output the two or more confidence score information using a classification model obtained by performing supervised machine learning using feature amounts of images of eyes of a plurality of subjects for training and the one or more background data of the subjects or the eyes of the subjects as training data, and classification results of relevant images as teaching data.

* * * * *